(12) United States Patent
Oh et al.

(10) Patent No.: US 12,244,182 B2
(45) Date of Patent: Mar. 4, 2025

(54) MOTOR

(71) Applicant: LG INNOTEK CO., LTD., Seoul (KR)

(72) Inventors: Sung Joo Oh, Seoul (KR); Jae Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 313 days.

(21) Appl. No.: 17/757,903

(22) PCT Filed: Nov. 30, 2020

(86) PCT No.: PCT/KR2020/017293
§ 371 (c)(1),
(2) Date: Jun. 23, 2022

(87) PCT Pub. No.: WO2021/132917
PCT Pub. Date: Jul. 1, 2021

(65) Prior Publication Data
US 2023/0031008 A1    Feb. 2, 2023

(30) Foreign Application Priority Data

Dec. 23, 2019   (KR) .................. 10-2019-0173173
Dec. 30, 2019   (KR) .................. 10-2019-0177621

(51) Int. Cl.
H02K 1/27    (2022.01)
H02K 1/278   (2022.01)
H02K 21/14   (2006.01)

(52) U.S. Cl.
CPC ............ *H02K 1/278* (2013.01); *H02K 21/14* (2013.01)

(58) Field of Classification Search
CPC ........ H02K 1/278; H02K 21/14; H02K 16/02; H02K 2201/06; H02K 1/2781; H02K 1/2783

(Continued)

(56) References Cited

U.S. PATENT DOCUMENTS 10,439,459 B2    10/2019   Udo et al.
2009/0001839 A1*  1/2009   Masayuki et al. ..... H02K 1/278
                                                   310/156.16

(Continued)

FOREIGN PATENT DOCUMENTS

CN    208806666 U      4/2019
DE    102017223622 A1 * 6/2019 ............. H02K 1/278

(Continued)

OTHER PUBLICATIONS

DE_102017223622_A1 translation by PE2E (Year: 2019).*

(Continued)

*Primary Examiner* — Thomas Truong
(74) *Attorney, Agent, or Firm* — Saliwanchik, Lloyd & Eisenschenk

(57) ABSTRACT

The present invention may provide a motor including a shaft, a rotor coupled to the shaft, and a stator disposed to correspond to the rotor, wherein the rotor includes a rotor core, a magnet disposed on an outer surface of the rotor core, and a guide in contact with the rotor core, the guide includes a first member in contact with one side surface of the rotor core and a plurality of second members (420, 430) which extend from the first member in an axial direction and are in contact with a side surface of the magnet, and positions of one side end portions and the other side end portions of the second members are different from each other in a circumferential direction.

6 Claims, 27 Drawing Sheets

(58) Field of Classification Search
USPC .................................................... 310/156.55
See application file for complete search history.

(56) References Cited

U.S. PATENT DOCUMENTS

| | | | |
|---|---|---|---|
| 2013/0342064 A1 | 12/2013 | Park | |
| 2018/0097413 A1* | 4/2018 | Sun et al. | H02K 1/28 310/156.31 |
| 2019/0386528 A1* | 12/2019 | Lee et al. | H02K 1/27 310/156.01 |

FOREIGN PATENT DOCUMENTS

| | | | | |
|---|---|---|---|---|
| JP | 2001-190039 A | 7/2001 | | |
| JP | 2009-72013 A | 4/2009 | | |
| JP | 2011-67057 A | 3/2011 | | |
| JP | 5030794 B2 | 9/2012 | | |
| JP | 2013102597 A * | 5/2013 | ............... | H02K 1/27 |
| JP | 2014-155372 A | 8/2014 | | |
| JP | 2017-103851 A | 6/2017 | | |
| JP | 2019-83651 A | 5/2019 | | |

OTHER PUBLICATIONS

JP_2013102597_A translation by worldwide.espacenet.com (Year: 2013).*

Supplementary European Search Report dated May 31, 2023 in European Application No. 20905482.4.

International Search Report dated Apr. 26, 2021 in International Application No. PCT/KR2020/017293.

Office Action dated Jun. 4, 2024 in Japanese Application No. 2022-539004.

* cited by examiner (a)

(b)

(a)

(b)

MOTOR

CROSS-REFERENCE TO RELATED APPLICATIONS

This application is the U.S. national stage application of International Patent Application No. PCT/KR2020/017293, filed Nov. 30, 2020, which claims the benefit under 35 U.S.C. § 119 of Korean Application No. 10-2019-0173173, filed Dec. 23, 2019, and Korean Application No. 10-2019-0177621, filed Dec. 30, 2019, the disclosures of each of which are incorporated herein by reference in their entirety.

TECHNICAL FIELD

The present invention relates to a motor.

BACKGROUND ART

A motor includes a stator and a rotor. The rotor includes a rotor core and magnets disposed on an outer surface of the rotor core. An adhesive is applied between the rotor core and the magnets. After the adhesive is applied, a curing process is performed. Accordingly, there are problems that the number of manufacturing processes of the motor increases, and the processes are complicated.

In addition, the rotor may include a cover surrounding the rotor core and the magnets. The cover may be a can member formed of a metal material. When the cover is used, a problem that positions of the magnets are misaligned may occur during a process in which the rotor core and the magnets are covered by the cover. In addition, since the cover covers the magnets, there are problems that it is difficult to visually check the positions of the magnets and precisely set and check a skew angle after the rotor core is covered by the cover.

In addition, types of motors include an inner permanent magnet (IPM) motor in which magnets are inserted into a core of a rotor and a surface permanent magnet (SPM) rotor in which magnets are attached to a surface of a core of a rotor.

In an SPM rotor, a plurality of magnets are bonded to an outer circumferential surface of a rotor core using an adhesive. In this case, a problem that other components are contaminated or an adhesive force is nonuniform while an adhesive between the outer circumferential surface of the rotor core and the magnets flows down occurs.

Technical Problem

The present invention is directed to providing a motor in which positions of magnets are arranged, it is easy to set and check a skew angle, and a phenomenon of a flow of an adhesive of the magnets is inhibited.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, and a stator disposed to correspond to the rotor, wherein the rotor includes a rotor core, a magnet disposed on an outer surface of the rotor core, and a guide in contact with the rotor core, the guide includes a first member in contact with one side surface of the rotor core and a plurality of second members which extend from the first member in an axial direction and are in contact with a side surface of the magnet, and positions of one side end portions and the other side end portions of the second members are different from each other in a circumferential direction.

Another aspect of the present invention provides a motor including a shaft, a rotor coupled to the shaft, wherein the rotor includes a rotor core, a magnet disposed on an outer surface of the rotor core, and a second member in contact with a side surface of the magnet, the second member includes a 2-1 member and a 2-2 member arranged in an axial direction, the 2-1 member and the 2-2 member are disposed to be misaligned in a circumferential direction, and the 2-1 member and the 2-2 member are integrally connected to each other.

Still another aspect of the present invention provides a motor including a shaft, a rotor coupled to the shaft, and a stator disposed to correspond to the rotor, wherein the rotor includes a first rotor core and a second rotor core which are disposed in an axial direction and a plurality of magnets disposed on an outer surface of the first rotor core and an outer surface of the second rotor core, the first rotor core includes a plurality of first protrusions protruding from the outer surface of the first rotor core, the second rotor core includes a plurality of second protrusions protruding from the outer surface of the second rotor core, and the rotor further includes a first member disposed between the first rotor core and the second rotor core in the axial direction and second members (420, 430) which are disposed between the first protrusion and the second protrusion in the axial direction and each of which is in contact with a side surface of each of the magnets.

The first member is in contact with one side surface of the first rotor core and the other side surface of the second rotor core, and the second members (420, 430) are in contact with one side surface of the first protrusion and the other side surface of the second protrusion.

The rotor core may include a first rotor core and a second rotor core arranged in the axial direction, and the first member may be disposed between the first rotor core and the second rotor core.

The second member may include a 2-1 member extending toward one side of the first member and a 2-2 member extending toward the other side of the first member in the axial direction.

Two side surfaces of the second member may include stepped surfaces.

The rotor core may include a plurality of protrusions protruding from an outer surface thereof, each of the protrusions may be in contact with a side surface of one of the magnets, and one side end portion of each of the protrusions may be in contact with one side end portion of the second member in the axial direction.

The rotor core may include a first protrusion and a second protrusion which protrude from the outer surface of the rotor core and are disposed apart from each other in the axial direction, the first protrusion may be in contact with the 2-1 member, and the second protrusion may be in contact with the 2-2 member in the axial direction.

The second member may include a body and an extension portion extending from the body, the body may be in contact with the side surface of the magnet, and the extension portion may be in contact with a part of an outer surface of the magnet.

The first member may include a third protrusion protruding from one side and a fourth protrusion protruding from the other side in the axial direction, and the third protrusion may be disposed to be misaligned with the fourth protrusion in a circumferential direction.

Yet another aspect of the present invention provides a motor including a shaft, a rotor coupled to the shaft, and a stator disposed to correspond to the rotor, wherein the rotor includes a rotor core and a plurality of magnets disposed on an outer side surface of the rotor core, a space portion is formed between the rotor core and the magnets, at least one partition is disposed in the space portion, and the partition overlaps the space portion in an axial direction.

An adhesive may be disposed in the space portion.

The space portion may be divided into at least two sections by the partition, and the at least two sections may be disposed in the axial direction.

The partition may be disposed at a lower end of the space portion, and a part of a lower side of the space portion may be closed by the partition.

A groove forming the space portion may be formed in a surface of the rotor core in contact with each of the magnets, and the at least one partition may extend from the rotor core.

The rotor core may include a plurality of first surfaces spaced apart from each other in a circumferential direction, a plurality of second surfaces disposed between the plurality of first surfaces and spaced apart from each other in the circumferential direction, a plurality of third surfaces connecting the plurality of first surfaces and the plurality of second surfaces, and fourth surfaces disposed between the plurality of second surfaces.

A distance from a center of the rotor to each of the first surfaces may be greater than a distance from the center of the rotor to each of the second surfaces.

A distance from the center of the rotor to each of the second surfaces may be greater than a distance from the center of the rotor to each of the fourth surfaces.

A groove forming the space portion may be formed in a surface of each of the magnets in contact with the rotor core, and the at least one partition may extend from each of the magnets.

A width of a cross section of the partition in a direction perpendicular to the axial direction may be smaller than a width of a cross section of the space portion in the direction perpendicular to the axial direction.

A width of a cross section of the partition in a direction perpendicular to the axial direction may be the same as a width of a cross section of the space portion in the direction perpendicular to the axial direction.

Yet another aspect of the present invention provides a motor including a shaft, a rotor coupled to the shaft, and a stator disposed to correspond to the rotor, wherein the rotor includes a rotor core and a plurality of magnets disposed on an outer side surface of the rotor core, the rotor core includes a plurality of first plates and at least one second plate which are stacked in an axial direction, and a groove is formed in a surface of each of the first plates in contact with one of the magnets, and a groove is not formed in a surface of the second plate in contact with each of the magnets.

An adhesive may be disposed in the groove.

The plurality of first plates may be sequentially stacked, and the at least one second plate may be stacked at a lower side of the plurality of first plates The at least one second plate may be disposed between the plurality of first plates.

An outer side portion of the second plate may overlap the adhesive disposed in the groove in the axial direction.

A ratio of a length of the rotor core in the axial direction to a thickness of the at least one second plate in the axial direction may be less than 0.3.

The first plate may include a plurality of 1-1 surfaces spaced apart from each other in a circumferential direction, a plurality of 1-2 surfaces which are disposed between the plurality of 1-1 surfaces and are spaced apart from each other in the circumferential direction, a plurality of 1-3 surfaces connecting the plurality of 1-1 surfaces and the plurality of 1-2 surfaces, and 1-4 surfaces disposed between the plurality of 1-2 surfaces, and the second plate may include a plurality of 2-1 surfaces spaced apart from each other in the circumferential direction, 2-2 surfaces disposed between the plurality of 2-1 surfaces, and a plurality of 2-3 surfaces connecting the plurality of 1-1 surfaces and the 2-2 surfaces.

A distance from a center of the rotor to each of the 1-1 surfaces may be greater than a distance from the center of the rotor to each of the 1-2 surfaces, and a distance from the center of the rotor to each of the 2-1 surfaces may be greater than a distance from the center of the rotor to each of the 2-2 surfaces.

A distance from the center of the rotor to each of the 1-2 surfaces may be greater than a distance from the center of the rotor to each of the 1-4 surfaces.

Yet another aspect of the present invention provides a motor including a shaft, a rotor coupled to the shaft, a stator disposed outside the rotor, wherein the rotor includes a rotor core and a plurality of magnets bonded to an outer side surface of the rotor core by an adhesive, the rotor core includes a plurality of first plates and at least one third plate which are stacked in an axial direction, a first groove is formed in a surface of each of the first plates in contact with one of the magnets, a second groove is formed in a surface of the third plate in contact with each of the magnets, and a width of a cross section of the second groove in the axial direction is smaller than a width of a cross section of the first groove in the axial direction.

The adhesive may be disposed in the first groove.

The plurality of first plates may be sequentially stacked, and the third plate may be stacked at a lower side of the plurality of first plates.

The at least one third plate may be stacked between the plurality of first plates.

An outer side portion of the third plate may overlap the adhesive disposed in the first groove in the axial direction.

A ratio of the sum of a thickness of the at least one third plate in the axial direction to a length of the rotor core in the axial direction may be less than 0.3.

The first plate may include a plurality of 1-1 surfaces spaced apart from each other in a circumferential direction, a plurality of 1-2 surfaces disposed between the plurality of 1-1 surfaces and spaced apart from each other in the circumferential direction, a plurality of 1-3 surfaces connecting the plurality of 1-1 surfaces and the plurality of 1-2 surfaces, and 1-4 surfaces disposed between the plurality of 1-2 surfaces, and the third plate may include a plurality of 3-1 surfaces spaced apart from each other in the circumferential direction, a plurality of 3-2 surfaces disposed between the plurality of 3-1 surfaces and spaced apart from each other in the circumferential direction, a plurality of 3-3 surfaces connecting the plurality of 3-1 surfaces and the plurality of 3-2 surfaces, and 3-4 surfaces disposed between the plurality of 3-2 surfaces.

A distance from a center of the rotor to each of the 1-1 surfaces may be greater than a distance from the center of the rotor to each of the 1-2 surfaces, and a distance from the center of the rotor to each of the 3-1 surfaces may be greater than a distance from the center of the rotor to each of the 3-2 surfaces.

A distance from the center of the rotor to each of the 1-2 surfaces may be greater than a distance from the center of the rotor to each of the 1-4 surfaces, and a distance from the center of the rotor to each of the 3-2 surfaces may be greater than a distance from the center of the rotor to each of the 3-4 surfaces.

A distance from the center of the rotor to each of the 3-4 surfaces may be greater than a distance from the center of the rotor to each of the 1-4 surfaces.

Advantageous Effects

According to embodiments, there is an advantage of fixing magnets to a rotor core without an adhesive.

According to the embodiments, there is an advantage of easily precisely arranging positions of the magnets.

According to the embodiments, there is an advantage of simplifying a manufacturing process of a motor and reducing a manufacturing time by omitting a curing process of an adhesive.

According to the embodiments, there is an advantage of inhibiting the magnets from colliding and being damaged during a process of installing the magnets on the rotor core.

According to the embodiments, there is an advantage of eliminating a cover which fixes the magnets.

According to the embodiments, there is an advantage of reducing a cogging torque by improving precision of a skew angle.

According to the embodiments, there are advantages of inhibiting the adhesive from contaminating other components by inhibiting the adhesive for attaching the magnets from flowing down and improving durability and increasing a use lifetime of the motor by maintaining a uniform adhesive force between the rotor core and the magnets.

MODES OF THE INVENTION

A direction parallel to a longitudinal direction (vertical direction) of a shaft is an axial direction, a direction perpendicular to the axial direction about the shaft is a radial direction, and a direction along a circumference of a circle having a radius in the radial direction about the shaft is a circumferential direction.

Figure 1:
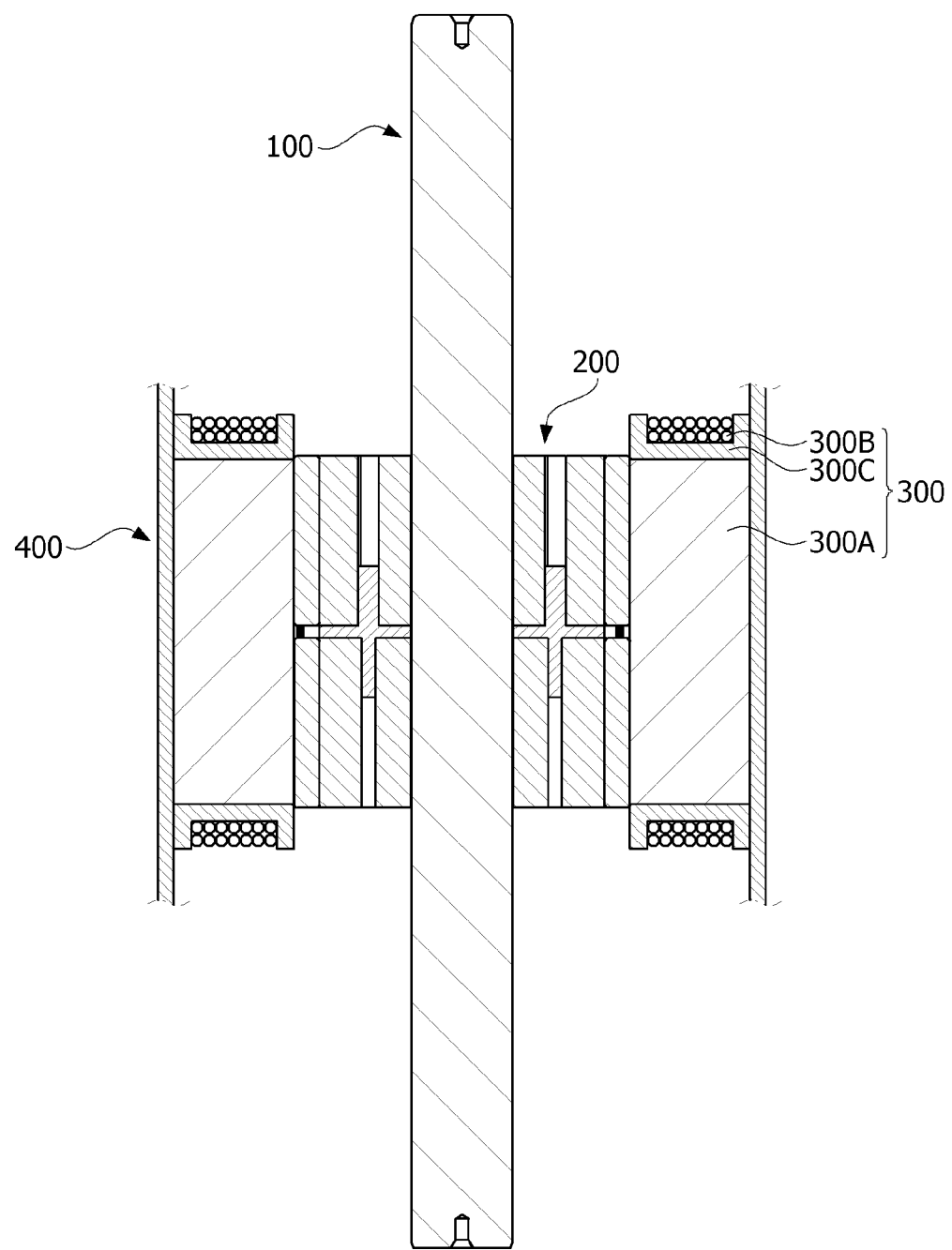
FIG. 1 is a view illustrating a motor according to an embodiment.

FIG. 1 is a view illustrating a motor according to an embodiment.

Referring to FIG. 1, the motor according to the embodiment may include a shaft 100, a rotor 200, a stator 300, a guide 400, and a housing 500. Hereinafter, the term "inward" refers to a direction from the housing 500 toward the shaft 100, and the term "outward" refers to a direction from the shaft 100 toward the housing 500, which is a direction opposite to "inward."

The shaft 100 may be coupled to the rotor 200. When an electromagnetic interaction occurs between the rotor 200 and the stator 300 due to the supply of a current, the rotor 200 rotates, and the shaft 100 rotates in conjunction with the rotor 200. The shaft 100 may be connected to a vehicle's steering shaft and may transmit power to the vehicle's steering shaft.

The rotor 200 rotates through an electrical interaction with the stator 300. The rotor 200 may be disposed inside the stator 300.

The stator 300 is disposed outside the rotor 200. The stator 300 may include a stator core 300A, coils 300B, and an insulator 300C installed on the stator core 300A. The coils 300B may be wound around the insulator 300C. The insulator 300C is disposed between the coils 300B and the stator core 300A to electrically insulate the stator core 300A from the coils 300B. The coils 300B induce an electrical interaction with magnets 220 (see FIG. 2) of the rotor 200.

The housing 500 may be disposed outside the rotor 200 and the stator 300.

Figure 2:
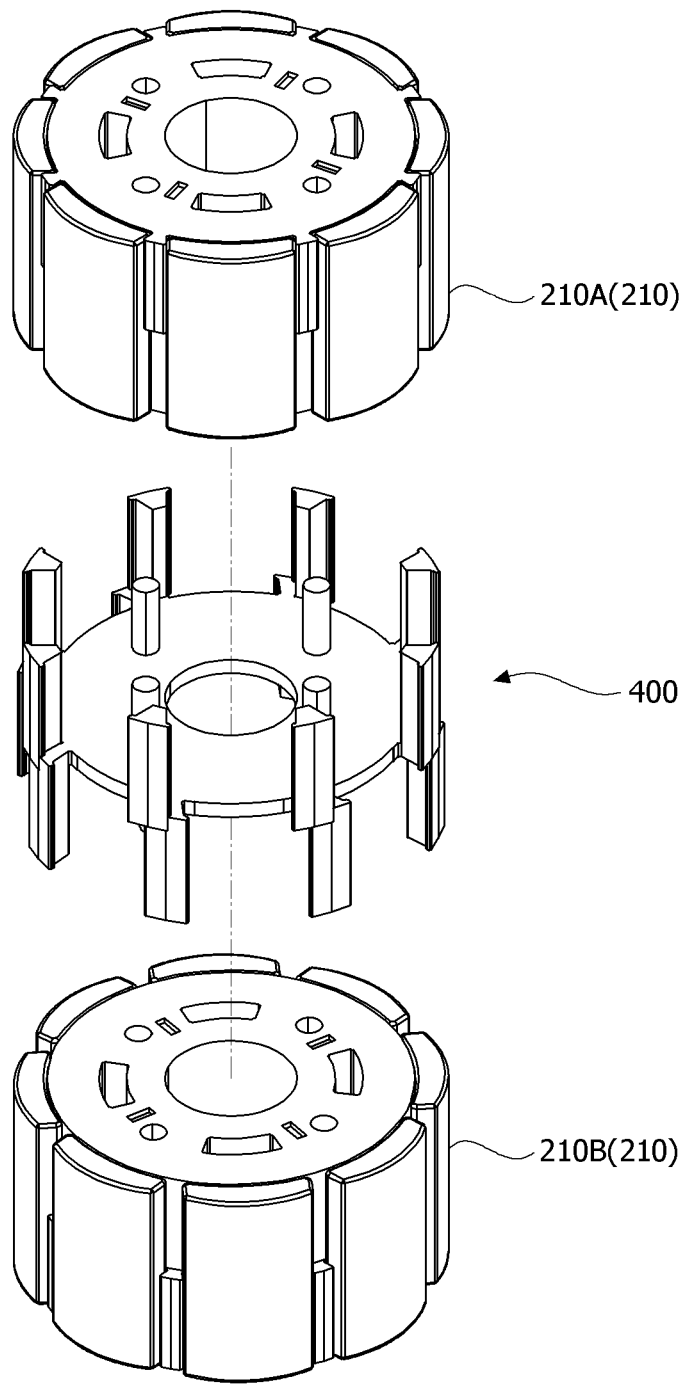
FIG. 2 is an exploded view illustrating a rotor.

FIG. 2 is an exploded view illustrating a rotor.

Referring to FIG. 2, the rotor 200 may include a rotor core 210, the magnets 220, and the guide 400. The magnets 220 are disposed outside the rotor core 210. The guide 400 may be formed of a plastic resin. The magnets 220 may be a plurality of combined unit magnets.

The rotor core 210 may include a first rotor core 210A and a second rotor core 210B. The first rotor core 210A and the second rotor core 210B are arranged in an axial direction. The first rotor core 210A and the second rotor core 210B may be disposed to form a skew angle. The magnets 220 may be divided into first magnets 220A and second magnets 220B. The first magnets 220A are disposed on an outer surface of the first rotor core 210A. The second magnets 220B are disposed on an outer surface of the second rotor core 210B.

The guide 400 may be disposed between the first rotor core 210A and the second rotor core 210B in the axial direction. The guide 400 is a member for fixing the magnets 220 to the rotor core 210 and a member which assists with coupling of the first rotor core 210A and the second rotor core 210B.

Figure 3:
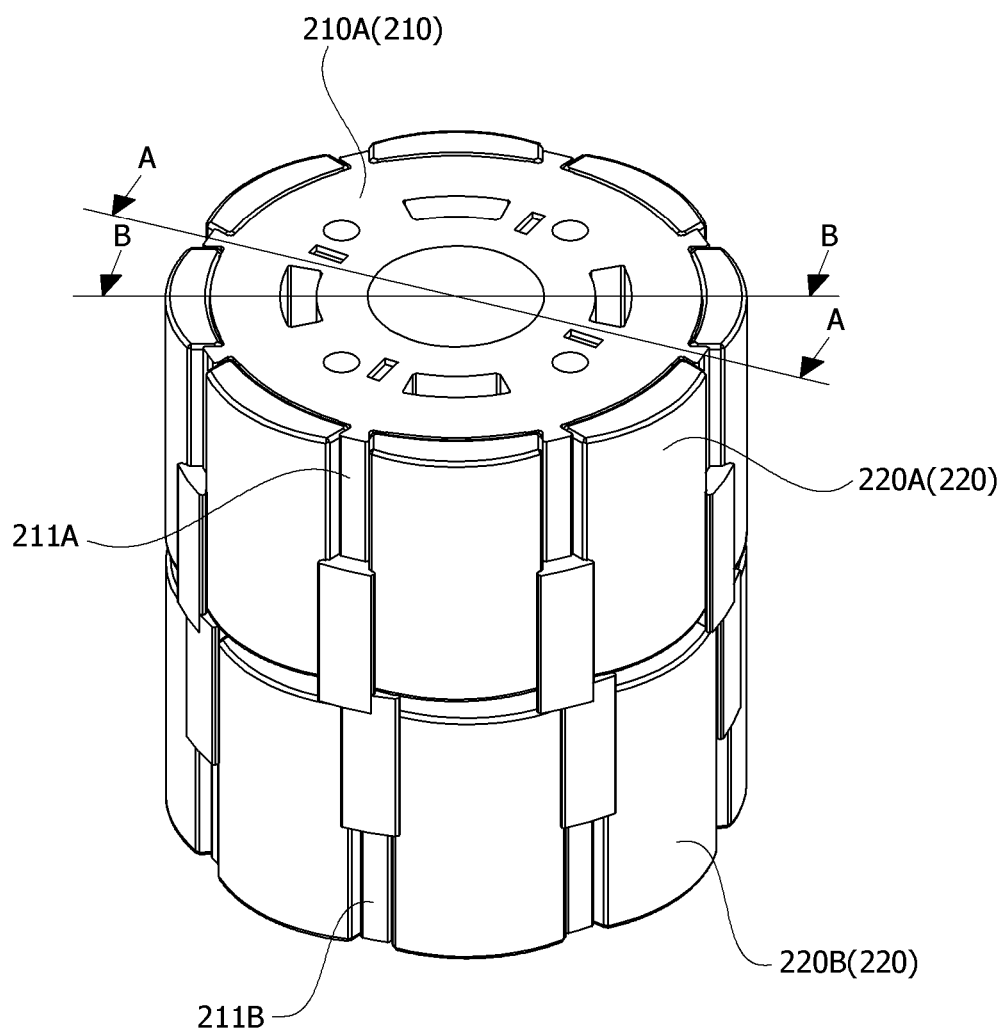
FIG. 3 is a perspective view illustrating the rotor.
Figure 4:
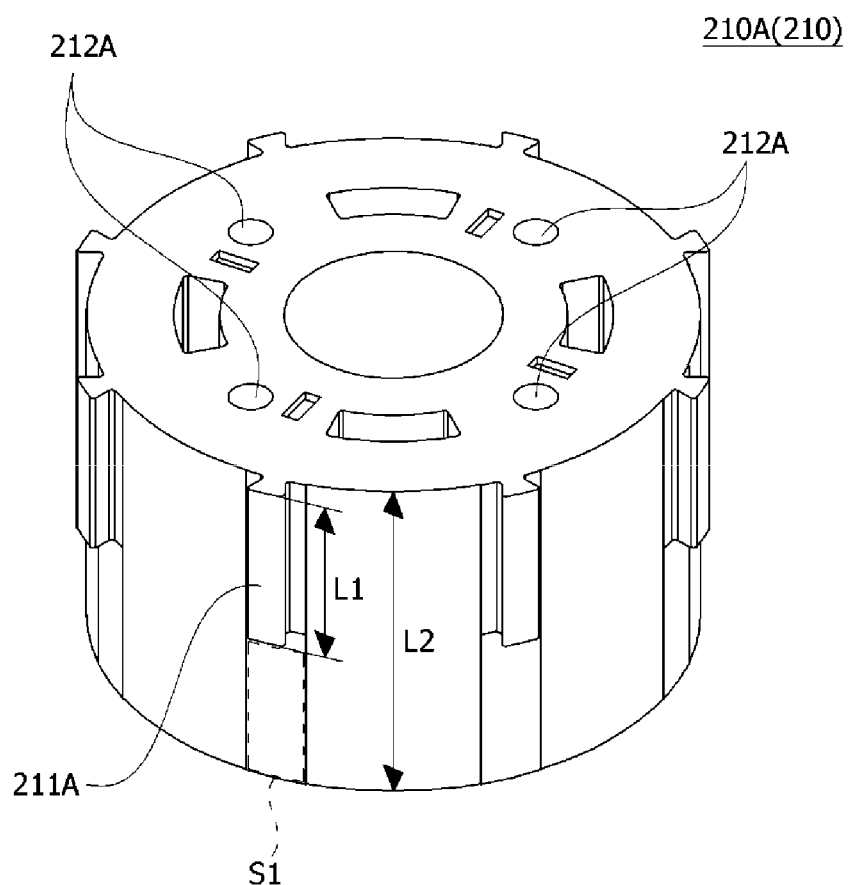
FIG. 4 is a perspective view illustrating a first rotor core.

FIG. 3 is a perspective view illustrating the rotor 200, and FIG. 4 is a perspective view illustrating the first rotor core 210A.

Referring to FIGS. 3 and 4, the first rotor core 210A and the second rotor core 210B are stacked with the guide 400 interposed therebetween in the axial direction. The first rotor core 210A and the second rotor core 210B are disposed to be misaligned with each other by a predetermined skew angle. Accordingly, the first magnets 220A and the second magnets 220 are also disposed to be misaligned with each other by a predetermined skew angle. The rotor core 210 may include a plurality of protrusions 211A and 211B. The protrusions 211A and 211B are in contact with side surfaces of the magnets 220. Hereinafter, among the protrusions 211A and 211B, the protrusions 211A or 211B disposed on the first rotor core 210A are referred to as first protrusions 211A, and the protrusions 211A or 211B disposed on the second rotor core 210B are referred to as second protrusions 211B.

The first rotor core 210A may include the plurality of first protrusions 211A. The first protrusions 211A are for guiding and fixing the first magnets 220A to the first rotor core 210A. The first protrusions 211A protrude from the outer surface of the first rotor core 210A. In addition, the first protrusions 211A may be disposed to extend in the axial direction. The plurality of first protrusions 211A may be disposed at predetermined intervals in a circumferential direction of the first rotor core 210A. The first magnets 220A are disposed between the first protrusions 211A are adjacent to each other.

A length L1 of the first protrusion 211A in the axial direction is shorter than a length L2 of the first rotor core 210A in the axial direction. When one side end of the first protrusion 211A matches one side end of the first rotor core 210A, as in FIG. 4, a space S1 without having the first protrusion 211A is provided. The space S1 is a space S1 though which second members 420 and 430 of the guide 400 enter.

A plurality of first holes 212A are disposed in the first rotor core 210A. The first holes 212A are disposed to pass through from one side surface to the other side surface of the first rotor core 210A. The first holes 212A are holes into which third protrusions 440 of the guide 400 are inserted.

Figure 5:
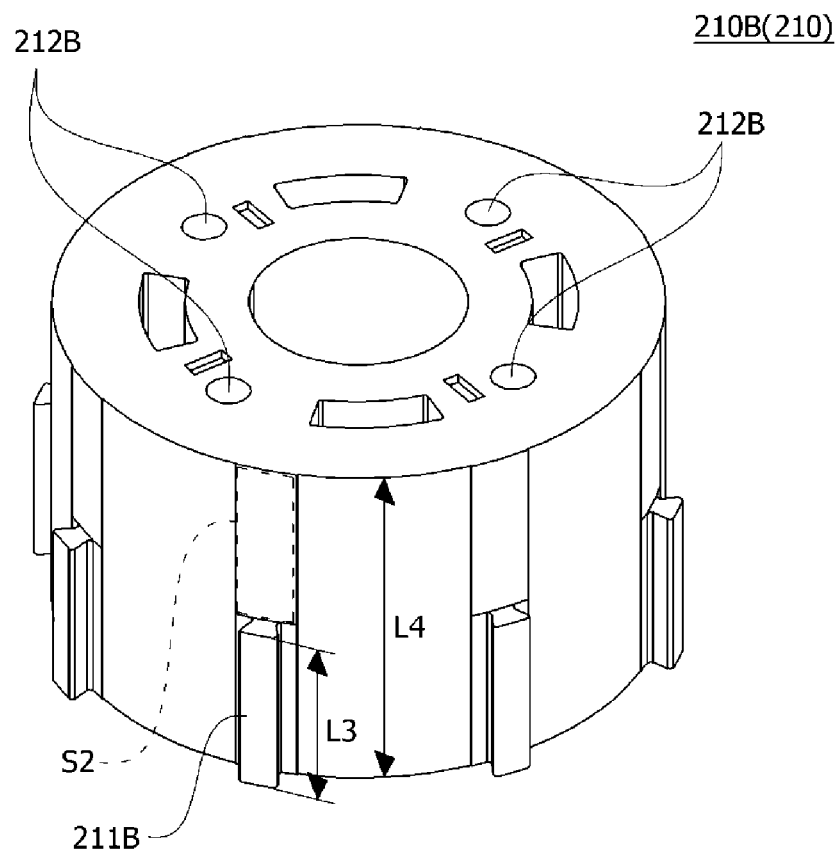
FIG. 5 is a perspective view illustrating a second rotor core.

FIG. 5 is a perspective view illustrating the second rotor core 210B.

Referring to FIGS. 3 and 5, the second rotor core 210B may include the plurality of second protrusions 211B. The second protrusions 211B are for guiding and fixing the second magnets 220B to the second rotor core 210B. The second protrusions 211B protrude from an outer surface of the second rotor core 210B. In addition, the second protrusions 211B may be disposed to extend in the axial direction. The plurality of second protrusions 211B may be provided at predetermined intervals in the circumferential direction of the second rotor core 210B. The second magnets 220B are disposed between the second protrusions 211B which are adjacent to each other.

A length L3 of the second protrusion 211B in the axial direction is smaller than a length L4 of the second rotor core 210B in the axial direction. When one side end of the second protrusion 211B matches one side end of the second rotor core 210B, as in FIG. 5, a space S2 without having the second protrusions 211B are formed. The space S2 is a space S2 through which the second members 420 and 430 of the guide 400 enter.

A plurality of second holes 212B are disposed in the second rotor core 210B. The second holes 212B are disposed to pass through from one side surface to the other side surface of the second rotor core 210B. The second holes 212B are holes into which fourth protrusions 450 of the guide 400 are inserted.

Figure 6:
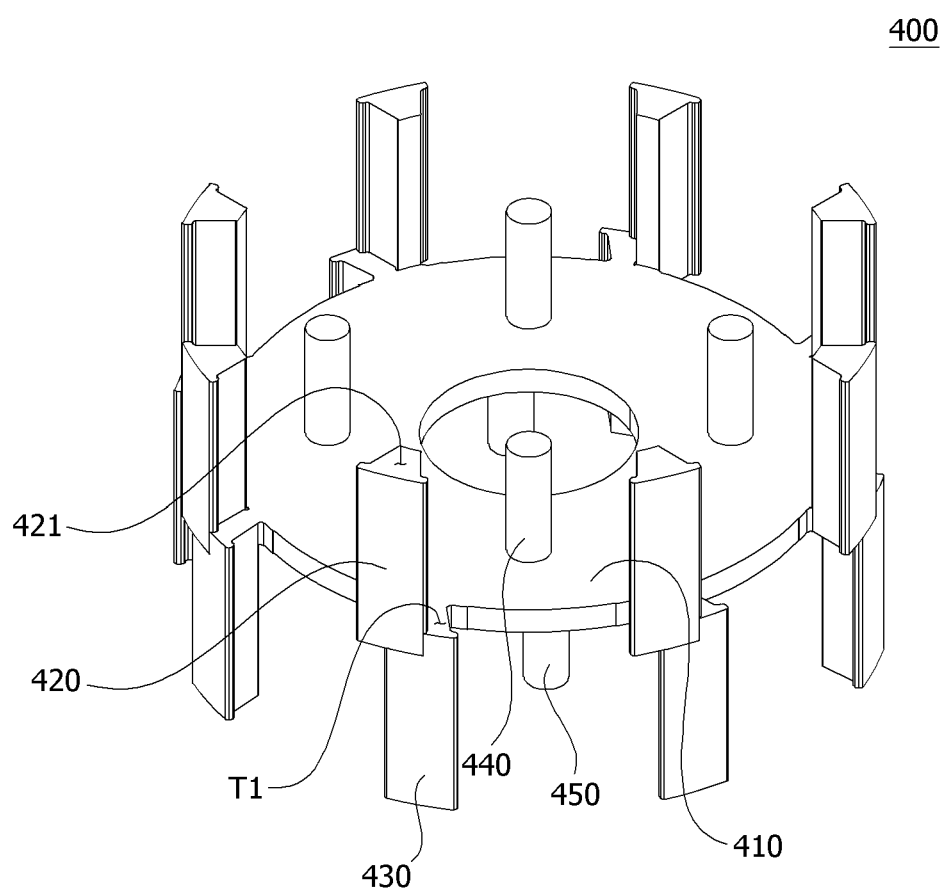
FIG. 6 is a perspective view illustrating a guide from above.

FIG. 6 is a perspective view illustrating the guide 400 from above.

Figure 7:
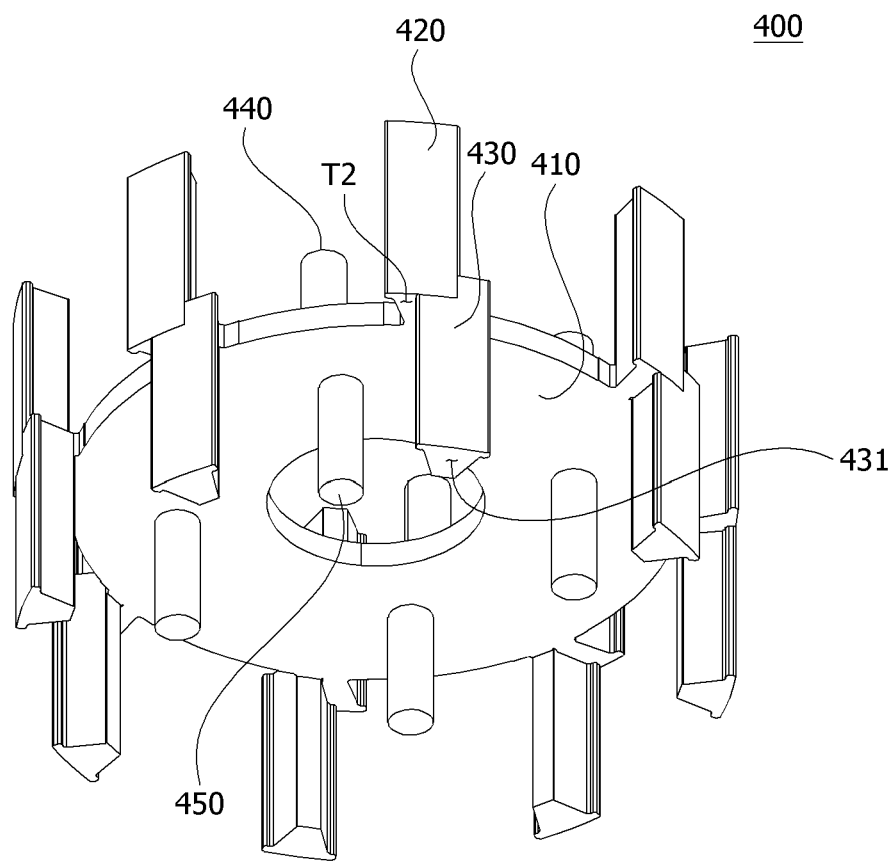
FIG. 7 is a perspective view illustrating the guide from below.

FIG. 7 is a perspective view illustrating the guide 400 from below.

Referring to FIGS. 6 and 7, the guide 400 may include a first member 410 and the second members 420 and 430.

The first member 410 is disposed between the first rotor core 210A and the second rotor core 210B in the axial direction and is in contact with one side surface of the first rotor core 210A and the other side surface of the second rotor core 210B. The first member 410 may be a flat plate member having an annular shape having a hole through which the shaft passes and which is formed in a central portion of the flat plate member. The first member 410 may include the third protrusions 440 and the fourth protrusions 450. The third protrusions 440 protrude from one side surface of the first member 410 in the axial direction. In addition, the fourth protrusions 450 protrude from the other side surface of the first member 410 in the axial direction. The third protrusions 440 are inserted into the first holes 212A of the first rotor core 210A, and the fourth protrusions 450 are inserted into the second holes 212B of the second rotor core 210B. The plurality of third protrusions 440 and the plurality of fourth protrusions 450 may be disposed. The third protrusions 440 and the fourth protrusions 450 may have cylindrical shapes.

The second members 420 and 430 are members extending from the first member 410 in the axial direction and are in contact with the side surface of the magnets 220. The plurality of second members 420 and 430 are disposed. The plurality of second members 420 and 430 may be disposed at predetermined intervals along an edge of the first member 410. The magnets 220 are positioned between the second members 420 and 430 which are adjacent to each other.

The second members 420 and 430 may be divided into 2-1 members 420 and 2-2 members 430. The 2-1 members 420 extend from one side surface of the first member 410 in the axial direction. The 2-2 members 430 extend from the other side surface of the first member 410 in the axial direction. Accordingly, the 2-1 members 420 may be disposed at one side of the first member 410, and the 2-2 members 430 may be disposed at the other side of the first member 410 in the axial direction.

In order to form a skew angle, one side end portions and the other side end portions of the second members 420 and 430 are disposed to be different from each other in the circumferential direction of the guide 400. The one side end portions of the second members 420 and 430 may correspond to one side end portions 421 of the 2-1 members 420, and the other side end portions of the second members 420 and 430 may correspond to one side end portions 431 of the 2-2 members 430. The 2-1 members 420 and the 2-2 members 430 are members connected to each other in the axial direction but are disposed to be misaligned with each other in the circumferential direction of the guide 400.

Since the 2-1 members 420 and the 2-2 members 430 are disposed to be misaligned with each other in the circumferential direction of the guide 400, stepped surfaces T1 and T2 are formed on two side surfaces of the second members 420 and 430. For example, in the second members 420 and 430, the first stepped surfaces T1 may be provided to be coplanar with one side surface of the first member 410 like first stepped surfaces T1 in FIG. 6, and the second stepped surfaces T2 may be provided to be coplanar with the other side surface of the first member 410 like second stepped surfaces T2 in FIG. 7. The first stepped surfaces T1 are surfaces in contact with one side surface of the first magnet 220A, and the second stepped surfaces T2 are surfaces in contact with one side surface of the second magnet 220B. The first stepped surfaces T1 and the second stepped surfaces T2 serve to support the magnets 220 in the axial direction.

Figure 8:
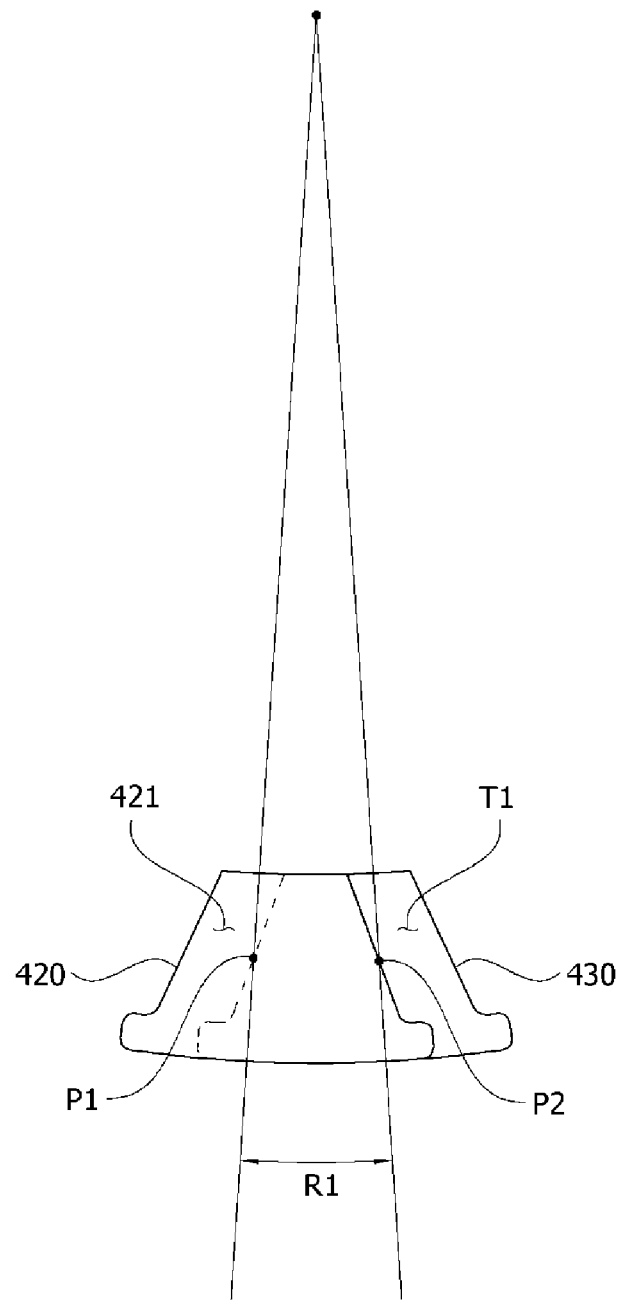
FIG. 8 is a view illustrating a skew angle with respect to a second member from one side.
Figure 9:
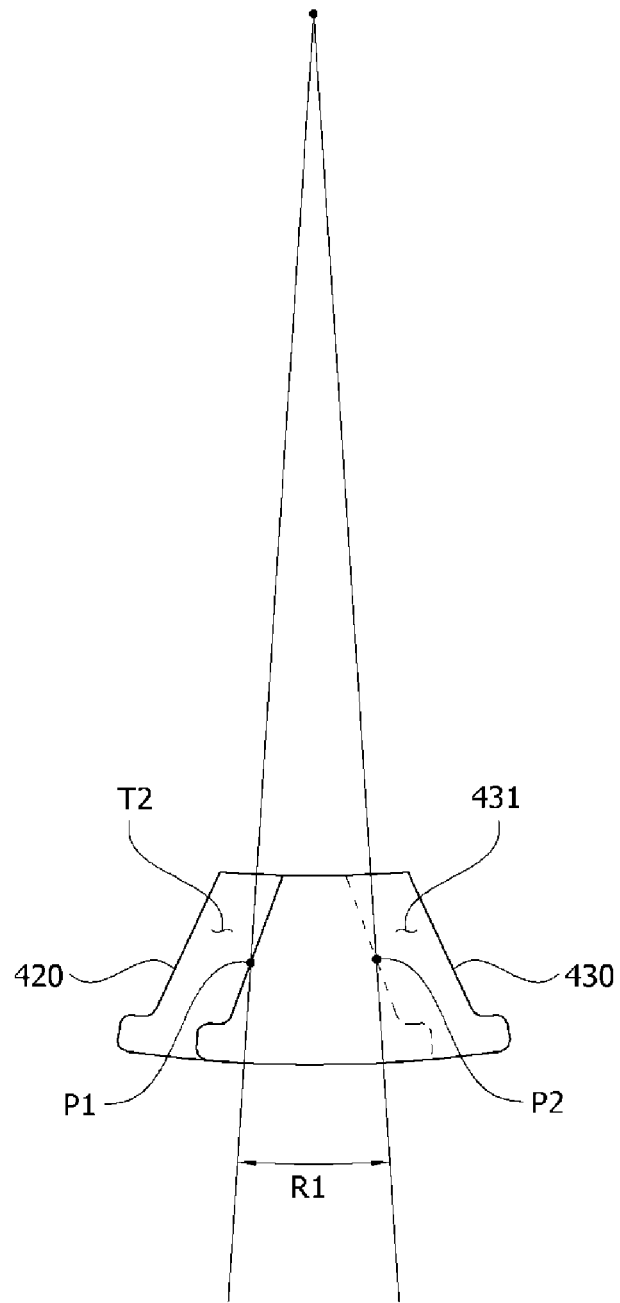
FIG. 9 is a view illustrating a skew angle with respect to a second member from the other side.

FIG. 8 is a view illustrating the skew angle with respect to the second members 420 and 430 from one side, and FIG. 9 is a view illustrating the skew angle with respect to the second members 420 and 439 from the other side.

Referring to FIGS. 8 and 9, the 2-1 member 420 and the 2-2 member 430 are disposed to be misaligned with each other in the circumferential direction of the guide 400. Accordingly, about a center of the guide 400, an angle R1 formed by a center P1 of one side end portion 421 of the 2-1 member 420 and a center P2 of one side end portion 431 of the 2-2 member 430 corresponds to the skew angle of the motor. Accordingly, the magnet 220 installed along the 2-1 member 420 and the 2-2 member 430 may be precisely guided to a position at which the corresponding angle is formed.

Figure 10:
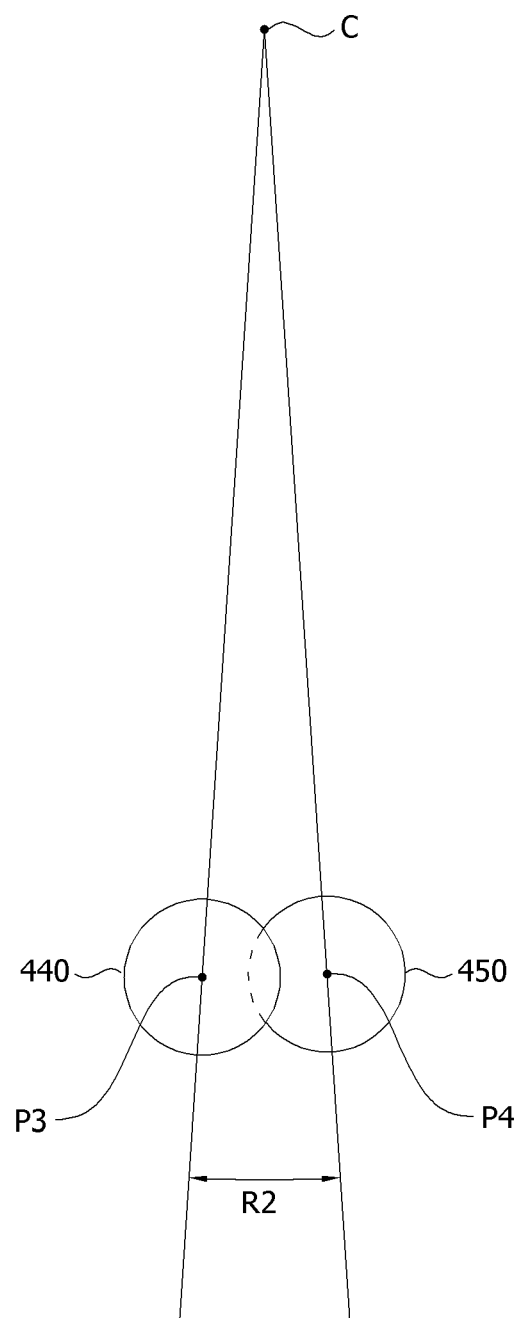
FIG. 10 is a view illustrating a skew angle with respect to a third protrusion and a fourth protrusion.

FIG. 10 is a view illustrating the skew angle with respect to the third protrusion and the fourth protrusion.

Referring to FIG. 10, the third protrusion 440 and the fourth protrusion 450 are disposed to be misaligned with each other in the circumferential direction of the guide 400. Accordingly, an angle R2 formed between a center of the third protrusion 440 and a center of the fourth protrusion 450 about the center of the guide 400 corresponds to the skew angle of the motor. In a process in which the guide 400 is installed in the rotor core 210, since the third protrusion 440 is inserted into the first hole 212A of the first rotor core 210A, and the fourth protrusion 450 is inserted into the second hole 212B of the second rotor core 210B, a position of the 2-1 member 420 and a position of the 2-2 member 430 may be precisely arranged in the circumferential direction of the guide 400. When the position of the 2-1 member 420 and the position of the 2-2 member 430 are precisely set, the magnet 220 installed along the 2-1 member 420 and the 2-2 member 430 may be precisely guided at a position at which the corresponding skew angle is formed.

Figure 11:
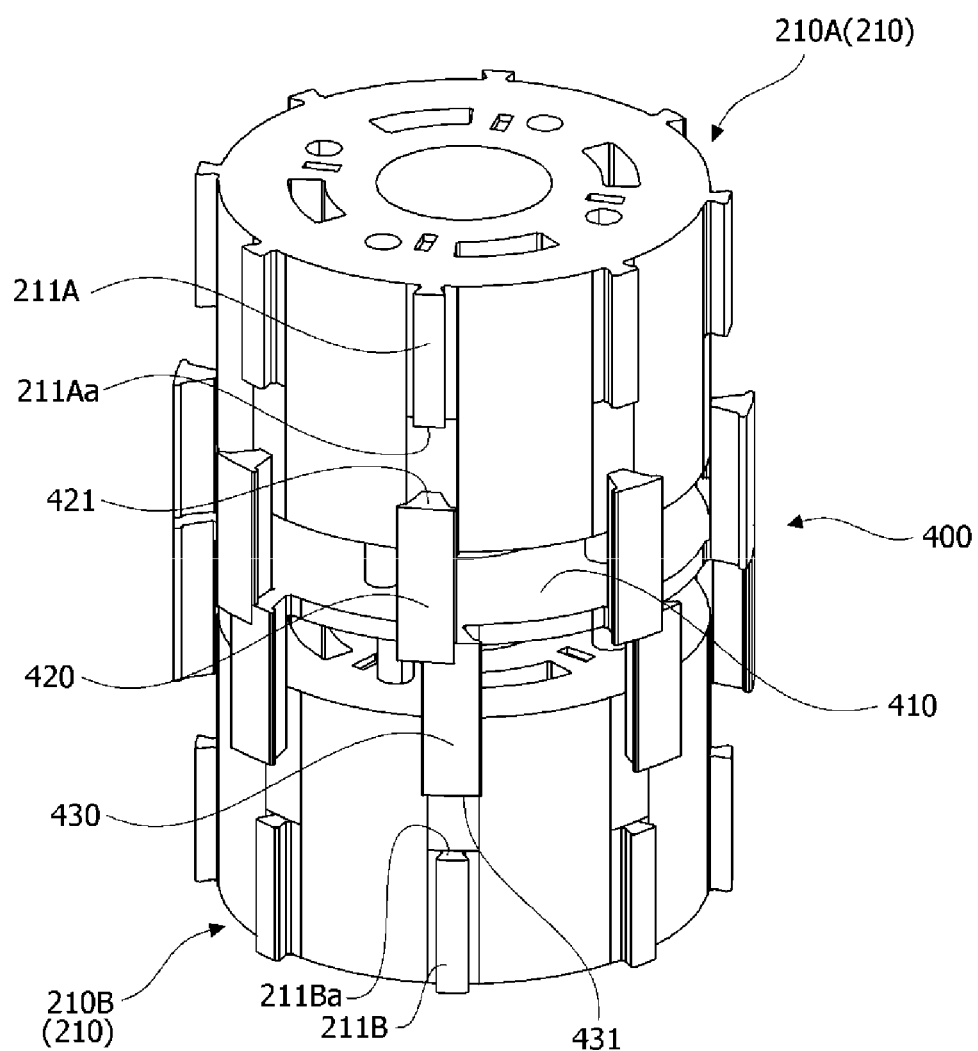
FIG. 11 is a view illustrating a process in which the guide is installed in the rotor core.
Figure 12:
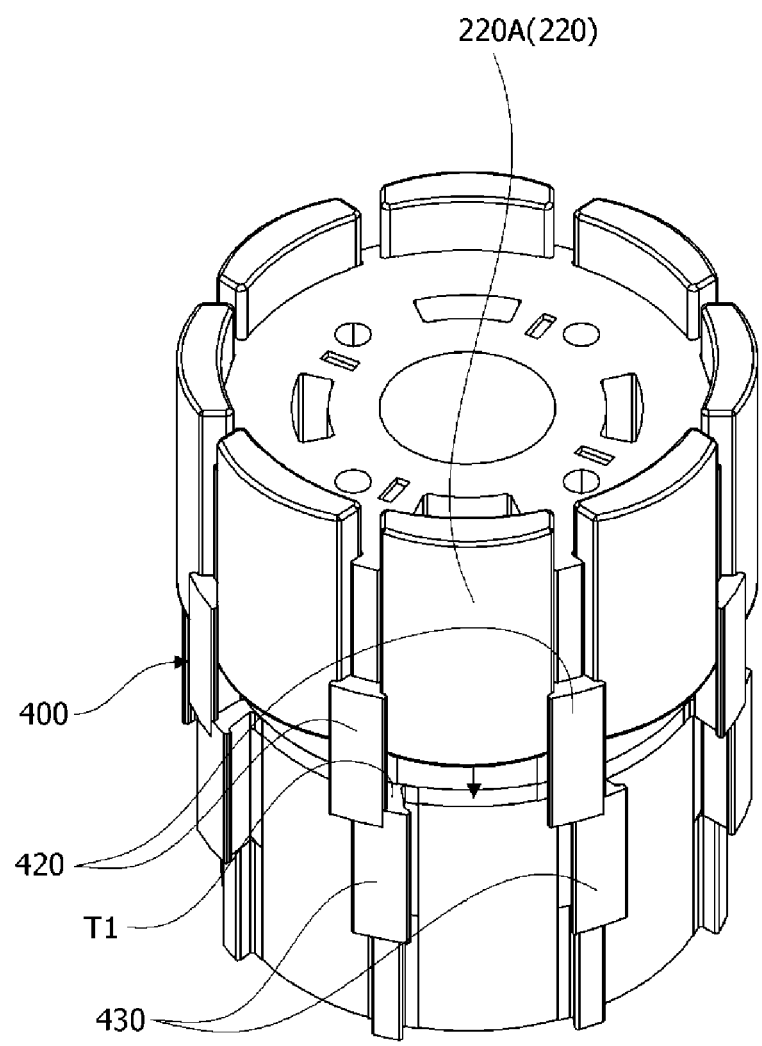
FIG. 12 is a view illustrating a process in which magnets are fixed to the rotor core using the guide.

FIG. 11 is a view illustrating a process in which the guide 400 is installed in the rotor core, and FIG. 12 is a view illustrating a process in which the magnets 220 are fixed to the rotor core 210 using the guide 400.

Referring to FIGS. 11 and 12, the first rotor core 210A may be installed on the guide 400 from one side of the guide 400, and the second rotor core 210B may be installed on the guide 400 from the other side of the guide 400 in the axial direction so that the guide 400 is disposed therebetween. In a state in which the 2-1 members 420 and the first protrusions 211A are aligned with each other in the circumferential direction of the guide 400, the first rotor core 210A is installed on the guide 400. In addition, the 2-2 members 430 and the second protrusions 211B are aligned with each other in the circumferential direction of the guide 400, the second rotor core 210B is installed on the guide 400.

In this case, the 2-1 members 420 and the first protrusions 211A face each other, become closer to each other, and finally come in contact with each other. In addition, the 2-2 members 430 and the second protrusions 211B also face each other, become closer to each other, and finally come in contact with each other.

Then, the magnets 220 are inserted between the second members 420 and 430 in the axial direction.

Figure 13:
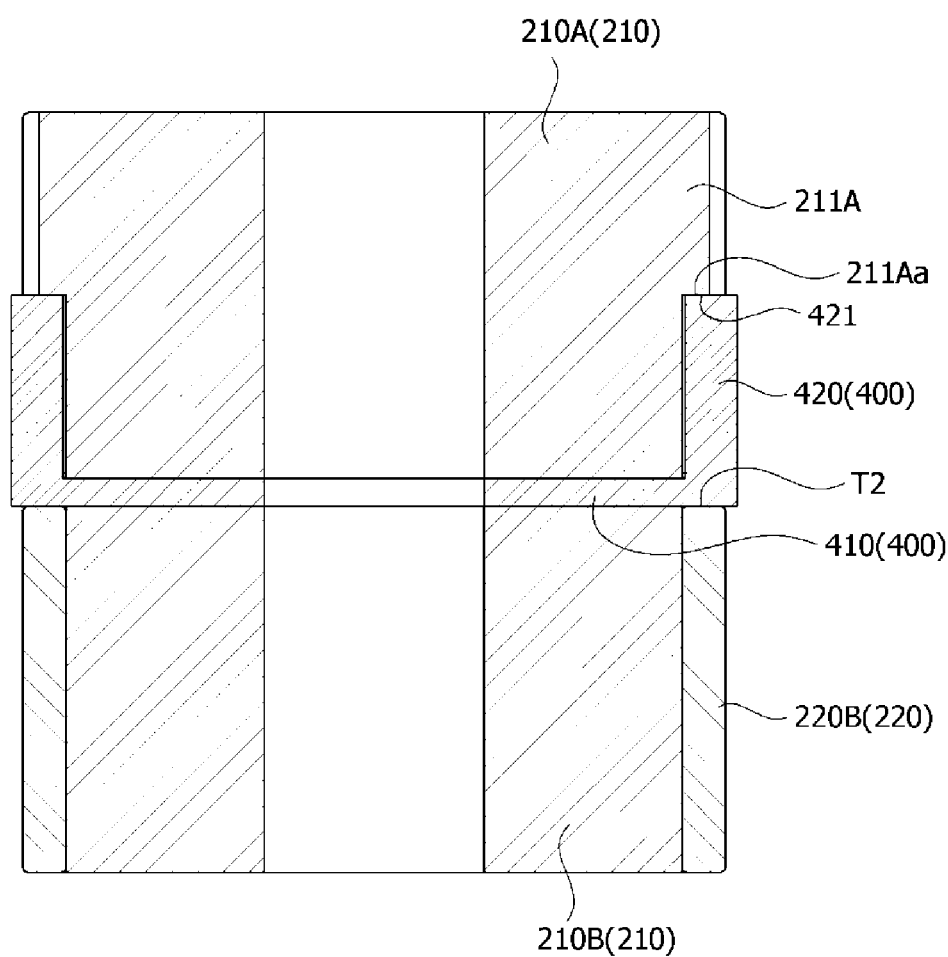
FIG. 13 is a side cross-sectional view illustrating the rotor along line A-A of FIG. 3.
Figure 14:
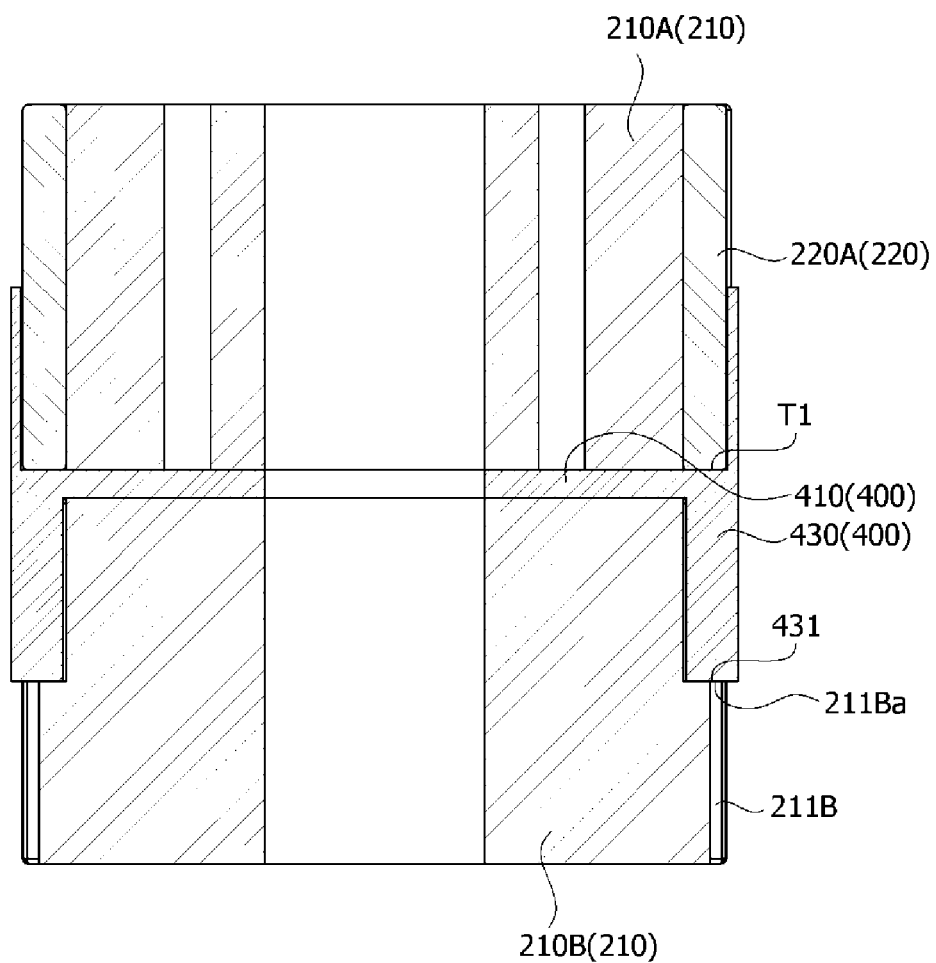
FIG. 14 is a side cross-sectional view illustrating the rotor along line B-B of FIG. 3.

FIG. 13 is a side cross-sectional view illustrating the rotor 200 along line A-A of FIG. 3, and FIG. 14 is a side cross-sectional view illustrating the rotor 200 along line B-B of FIG. 3.

Referring to FIG. 13, when the magnets 220 are assembled to the rotor core 210 using the guide 400, one side surfaces 211Aa of the first protrusions 211A are in contact with one side end portions 421 of the 2-1 members 420. In this case, one side ends of the second magnets 220B are in contact with the second stepped surfaces T2 of the second members 420 and 430. The second magnets 220B are supported by the second stepped surfaces T2 in the axial direction.

Referring to FIG. 14, when the magnets 220 are assembled to the rotor core 210 using the guide 400, one side surfaces 211Ba of the second protrusions 211B are in contact with one side end portions 431 of the 2-2 members 430. In this case, one side ends of the first magnets 220A are in contact with the first stepped surfaces T1 of the second members 420 and 430. The first magnets 220A are supported by the first stepped surfaces T1 in the axial direction.

Figure 15:
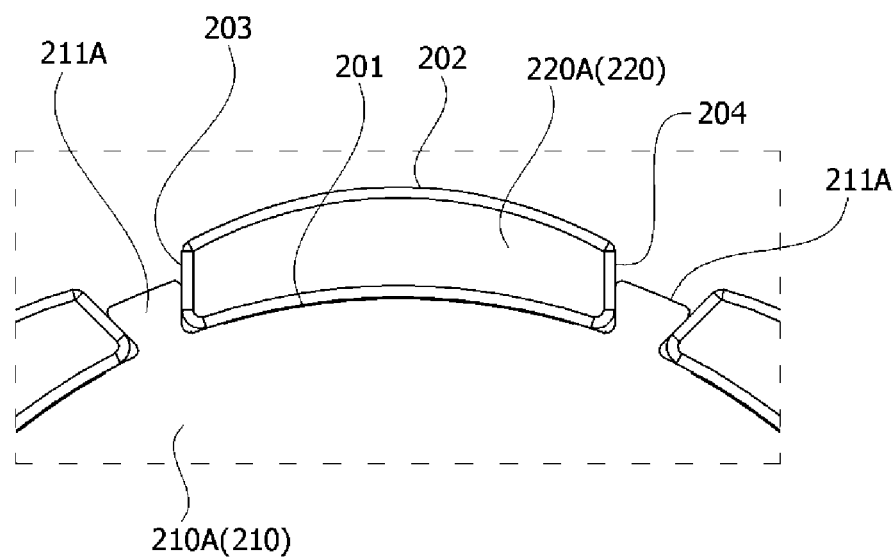
FIG. 15 is a view illustrating first magnets supported by first protrusions.
Figure 16:
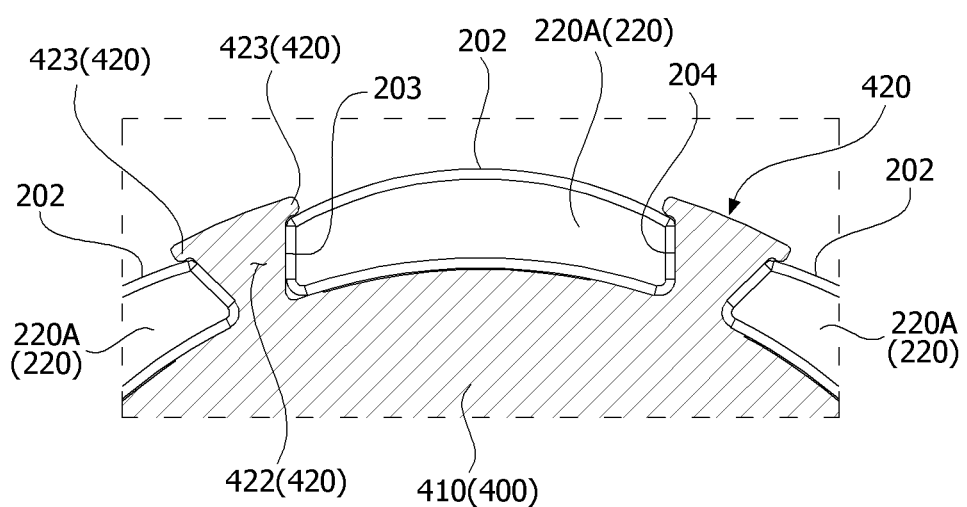
FIG. 16 is a view illustrating the magnets further supported by second members.

FIG. 15 is a view illustrating the first magnets 220A supported by the first protrusions 211A, and FIG. 16 is a view illustrating the magnets 220 further supported by the second members 420 and 430.

Referring to FIG. 15, the first protrusions 211A are in contact with side surfaces of the first magnets 220A to guide assembly of the first magnets 220A and support the first magnets 220A so that the first magnets 220A do not move in the circumferential direction of the rotor 200. In addition, the first protrusions 211A are formed so that widths of inner sides are greater than widths of outer sides, and fix the first magnets 220A so that the first magnets 220A are not separated in the radial direction of the rotor 200. Although not illustrated in the drawings, the second protrusions 211B also similarly support the second magnets 220B.

Referring to FIG. 16, the 2-1 members 420 may include bodies 422 and extension portions 423 extending from the bodies 422. The bodies 422 are disposed between the adjacent first magnets 220A and are in contact with side surfaces of the first magnets 220A. The bodies 422 are in contact with the side surfaces of the first magnets 220A to guide assembly of the first magnets 220A and support the first magnets 220A so that the first magnets 220A do not move in the circumferential direction of the rotor 200.

The extension portions 423 are in contact with outer surfaces of the first magnets 220A. The extension portions 423 are in contact with the outer surfaces of the first magnets 220A to firmly fix the first magnets 220A so that, along with the first protrusions 211A, the first magnets 220A are not separated in the radial direction of the rotor 200. Although not illustrated in the drawings, similarly, the 2-2 members 430 also include such bodies and extension portions and support the second magnets 220B FIG. 17 is a cross-sectional view illustrating a motor according to another embodiment.

Figure 17:
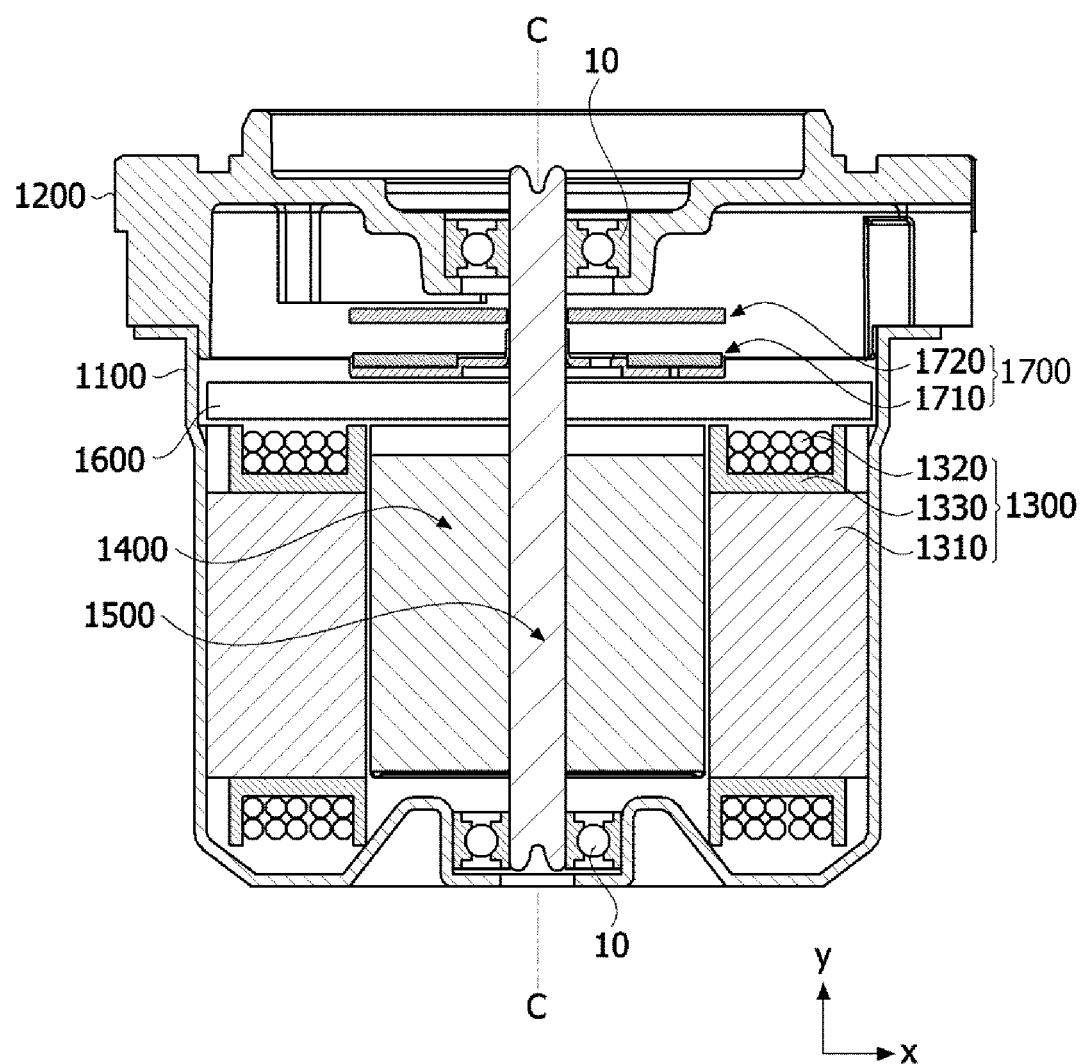
FIG. 17 is a cross-sectional view illustrating a motor according to another embodiment.

Referring to FIG. 17, the motor according to the embodiment may include a housing 1100 having one side at which an opening is formed, a cover 1200 disposed on the housing 1100, a stator 1300 disposed in the housing 1100, a rotor 1400 disposed inside the stator 1300, a shaft 1500 which is coupled to the rotor 1400 and rotates, a busbar 1600 disposed on the stator 1300, and a sensor part 1700 configured to detect rotation of the shaft 1500.

The housing 1100 and the cover 1200 may form an exterior of the motor. The housing 1100 and the cover 1200 are coupled to form an accommodation space. In this case, the stator 1300, the rotor 1400, the shaft 1500, and the like may be disposed in the accommodation space. In this case, the shaft 1500 is rotatably disposed in the accommodation space. In addition, a motor 1 may further include bearings 10 disposed on upper and lower portions of the shaft 1500.

A shape or material of the housing 1100 may be variously changed. For example, the housing 1100 may be formed of a metal material which firmly withstands even high temperatures.

The cover 1200 is disposed on the housing 1100 and covers the opening of the housing 1100.

The stator 1300 may be disposed inside the housing 1100. In this case, the stator 1300 may be coupled to the housing 1100 in a hot press-fit manner. In addition, the stator 1300 may be supported by an inner circumferential surface of the housing 1100.

The stator 1300 is disposed outside the rotor 1400. The stator 1300 may include a stator core 1310, coils 1320, and an insulator 1330. The insulator 1330 is installed on the stator core 1310. In this case, the coils 1320 are wound around the insulator 1330. In this case, the insulator 1330 is disposed between the stator core 1310 and the coils 1320 to insulate the coils 1320.

The coils 1320 which generate a rotational magnetic field may be wound around the stator core 1310.

The stator core 1310 may be formed in a form in which a plurality of thin steel plates are stacked but is not limited thereto. For example, the stator core 1310 may also be formed as a single part. In addition, the stator core 1310 may be formed by arranging a plurality of unit stator cores in a circumferential direction. The rotor 1400 may be disposed inside the stator 1300. In addition, the shaft 1500 may be coupled to a center portion of the rotor 1400.

The shaft 1500 may be disposed in the housing 1100 to be rotatable due to the bearings 10. In addition, the shaft 1500 may rotate with the rotor 1400 in conjunction with rotation of the rotor 1400.

Figure 18:
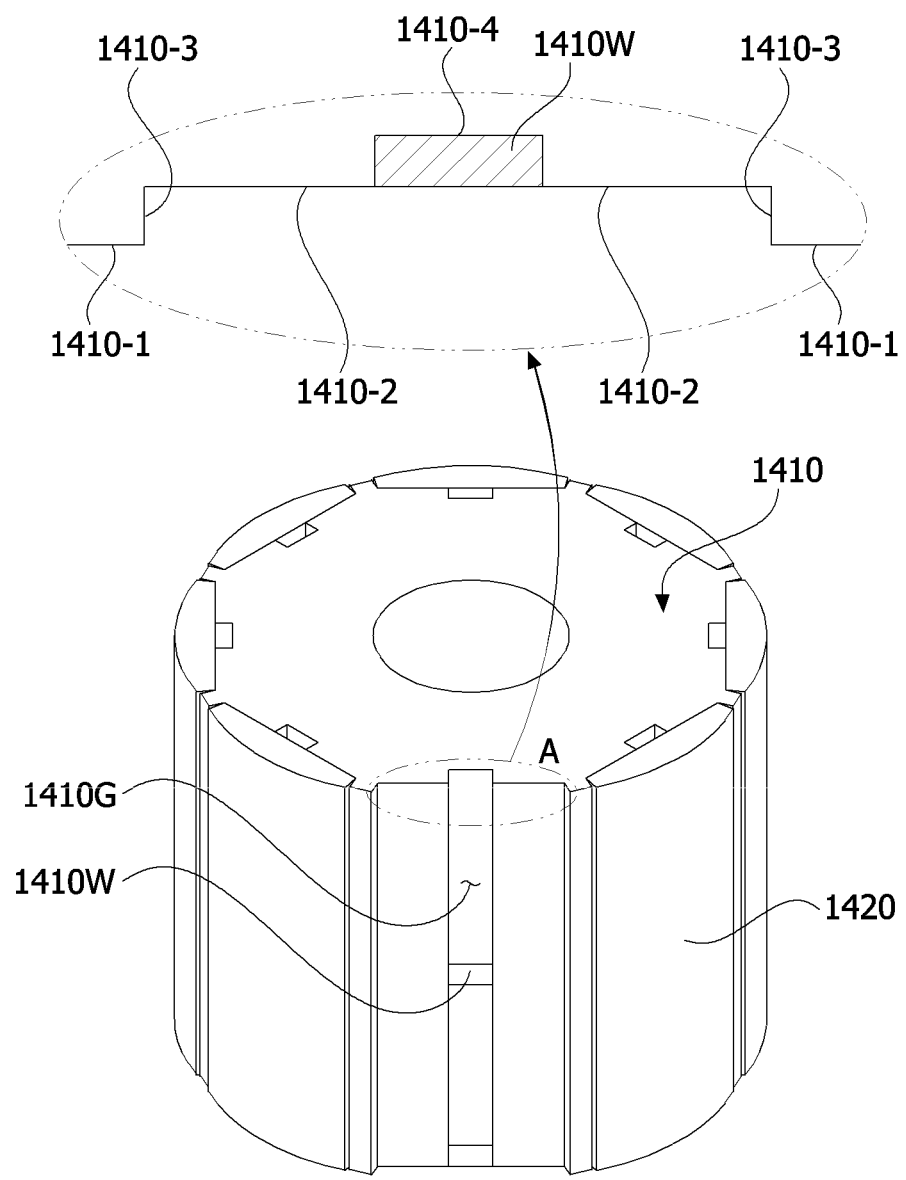
FIG. 18 is a view illustrating a rotor according to another embodiment.

FIG. 18 is a view illustrating the rotor according to another embodiment.

Referring to FIG. 18, the rotor 1400 may include a rotor core 1410 and magnets 1420. The rotor core 1410 is rotationally disposed in a cylindrical space portion formed in a central portion of the stator 1300.

The plurality of magnets 1420 may be disposed on an outer circumferential surface of the rotor core 1410. In addition, facing surfaces of the rotor core 1410 and the magnets 1420 may be bonded. In this case, space portions 1410G may be formed between the rotor core 1410 and the magnets 1420. An adhesive may be disposed in the space portions 1410G. In addition, one or more partitions 1410W disposed in each of the space portions 1410G may be included. In this case, the partitions 1410W overlap the space portions 1410G in an axial direction. That is, one or more partitions 1410W may serve to support the adhesive disposed in each of the space portions 1410G in the axial direction.

The plurality of partitions 1410W may be provided. The partitions 1410W may divide each of the space portions 1410G into one or two sections. The divided sections may be disposed in the axial direction. The partition 1410W may divide the space portion 1410G into an upper portion and a lower portion. In this case, the adhesive may be applied on the upper portion and the lower portion of the space portion 1410G. In addition, the partition 1410W may be disposed in a lower end of the space portion 1410G. In this case, at least a part of a lower side of the space portion 1410G may be closed by the partition 1410W.

Outer side ends of the partitions 1410W may be in contact with the magnets 1420. In this case, a width of a cross section of each of the partitions 1410W cut in a direction perpendicular to the axial direction is equal to a width of a cross section of each of the space portions 1410G cut in the direction perpendicular to the axial direction. Accordingly, the partition 1410W may divide the space portion 1410G into a plurality of closed sections. In addition, the lower side of the space portion 1410G may be closed.

Outer side ends of the partitions 1410W may also be spaced apart from the magnets 1420. In this case, a width of a cross section of each of the partitions 1410W cut in the direction perpendicular to the axial direction may be smaller than a width of a cross section of each of the space portions 1410G cut in the direction perpendicular to the axial direction. Accordingly, the partitions 1410W may divide each of the space portions 1410G into the plurality of sections so that parts of the sections may be connected. In addition, only a part of a lower side of each of the space portion 1410G may be closed.

Grooves extending in the axial direction may be formed in a surface of the rotor core 1410 in contact with the magnets 1420. In this case, the grooves may form the space portions 1410G between the rotor core 1410 and the magnets 1420. In addition, the partitions 1410W may extend on the rotor core 1410.

The rotor core 1410 may include a plurality of first surfaces 1410-1, a plurality of second surfaces 1410-2, a plurality of third surfaces 1410-3, and fourth surfaces 1410-4 on an outer circumferential surface thereof.

The plurality of first surfaces 1410-1 are provided. The plurality of first surfaces 1410-1 may be disposed between the plurality of magnets 1420. The plurality of first surfaces 1410-1 are spaced apart from each other in the circumferential direction. The first surfaces 1410-1 are not in contact with the magnets 1420.

The second surfaces 1410-2 may be disposed between the plurality of first surfaces 1410-1. The plurality of second surfaces 1410-2 are provided. The plurality of second surfaces 1410-2 are spaced apart from each other. In this case, a distance from a center of the rotor to each of the first surfaces 1410-1 may be greater than a distance from the center of the rotor to each of the second surfaces 1410-2. That is, the second surfaces 1410-2 are formed to be recessed closer to the shaft 1500 than the first surfaces 1410-1. In this case, the second surfaces 1410-2 are in contact with inner side surfaces of the magnets 1420.

The third surfaces 1410-3 connect the plurality of first surfaces 1410-1 and the plurality of second surfaces 1410-2. In this case, the third surfaces 1410-3 are in contact with two side surfaces of each of the magnets 1420.

The fourth surfaces 1410-4 are disposed between the plurality of second surfaces 1410-2. In this case, a distance from the center of the rotor to each of the second surfaces 1410-2 may be greater than a distance from the center of the rotor to each of the fourth surfaces 1410-4. That is, the fourth surfaces 1410-4 are formed to be recessed closer to the shaft 1500 than the second surfaces 1410-2. In this case, the space portions 1410G may be formed between the fourth surfaces 1410-4 and the magnets 1420.

Although not illustrated in the drawings, grooves may be formed in inner side surfaces of the magnets. In this case, space portions may be formed by the grooves between the magnets and the rotor core. In addition, partitions may extend in the inner side surfaces of the magnets. In addition, although not illustrated in the drawings, a groove may also be formed in one selected from each of the magnets and the rotor core. In this case, a space portion may be formed by the groove between each of the magnets and the rotor core. In addition, a partition may also extend from the other of each of the magnets and the rotor core.

Figure 19:
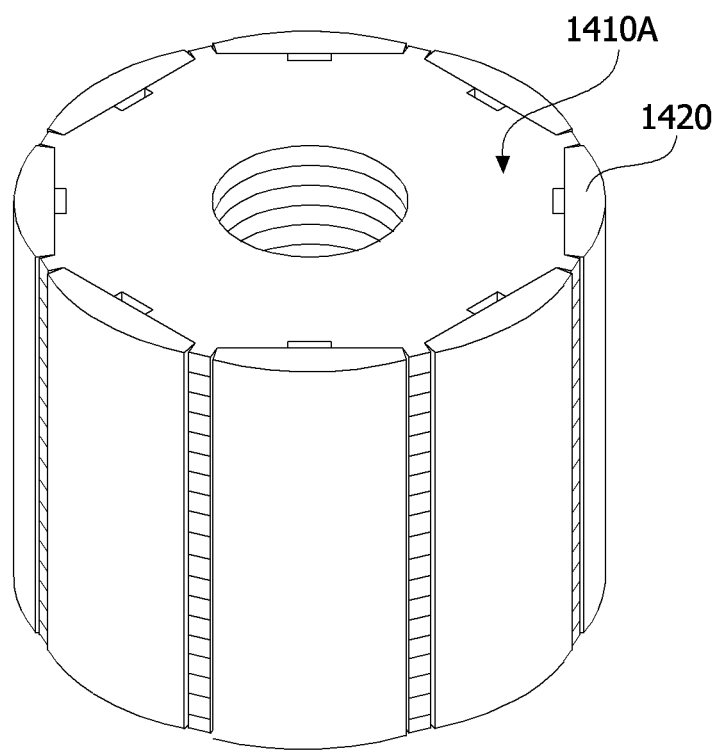
FIGS. 19 and 20 are views illustrating a rotor according to still another embodiment.
Figure 20:
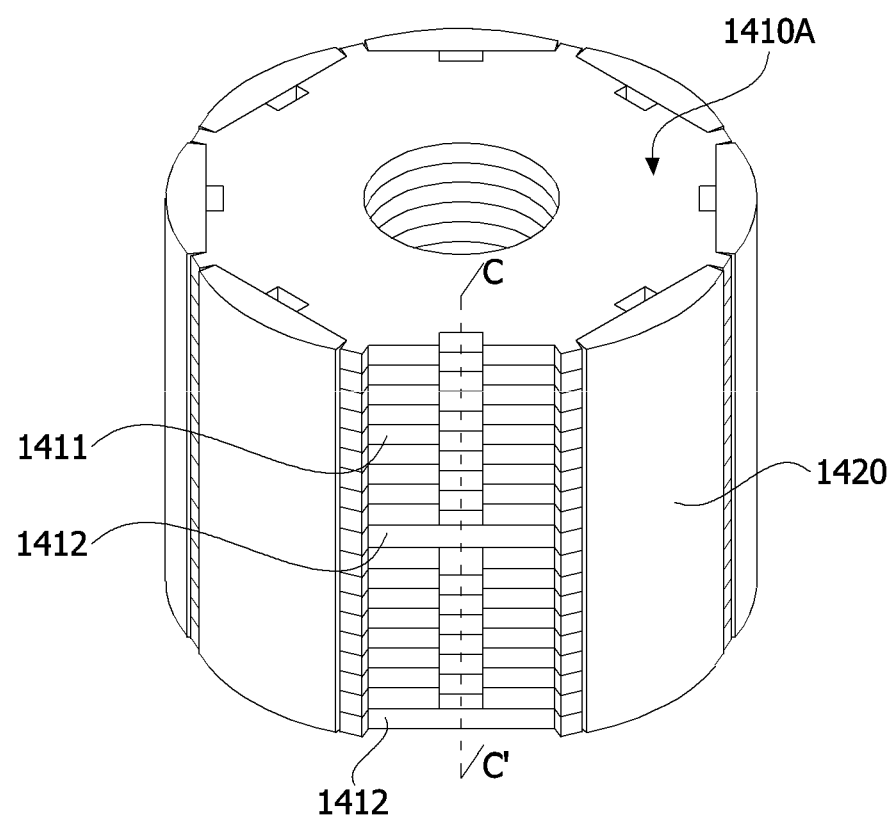
Figure 21:
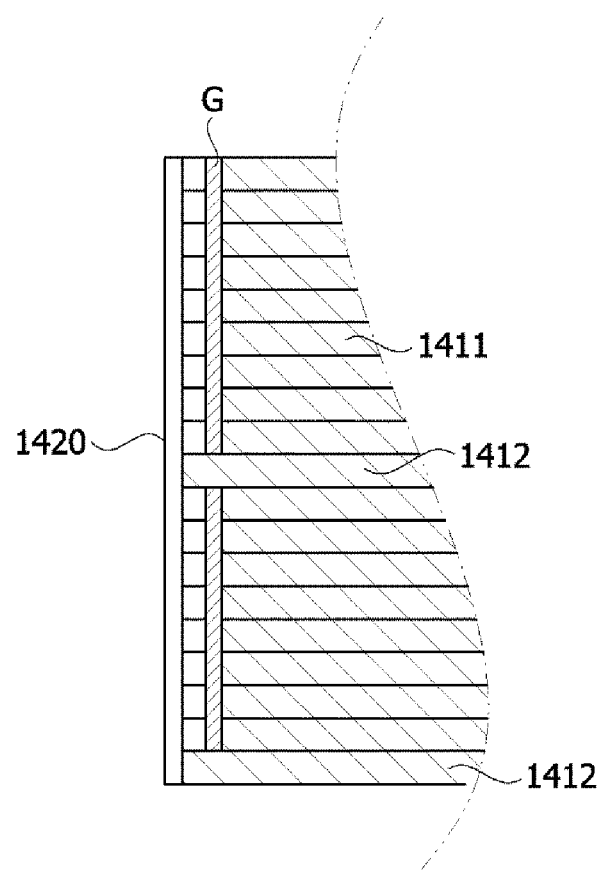
FIG. 21 is a view illustrating a state in which an adhesive is applied on a cross section CC' of FIG. 20.

FIGS. 19 and 20 are views illustrating a rotor according to still another embodiment, and FIG. 21 is a view illustrating a state in which an adhesive is applied on a cross section CC' of FIG. 19.

Referring to FIGS. 19 and 20, a rotor core 1410A may be formed by stacking a plurality of core plates. The plurality of core plates are stacked in an axial direction. A plurality of magnets 1420 are disposed on an outer circumferential surface of the rotor core 1410A. In this case, a plurality of magnet grooves allowing the plurality of magnets 1420 to be disposed may be formed in the rotor core 1410A. The plurality of magnets grooves may be disposed apart from each other in a circumferential direction. In this case, depths of the magnet grooves may be smaller than thicknesses of the magnets 1420.

The rotor core 1410A may be formed using two or more types of core plates. The rotor core 1410A may include a plurality of first plates 1411 and one or more second plates 1412.

Grooves are formed in surfaces of the first plates 1411 in contact with the magnets 1420. In addition, grooves are not formed in surfaces of the second plates 1412 in contact with the magnets 1420. Referring to FIG. 21, an adhesive G is disposed in the grooves of the first plates 1411. In this case, outer side ends of the second plates 1412 block the grooves of the first plates 1411 in the axial direction. Accordingly, the adhesive G disposed in the grooves of the first plates 1411 may be inhibited from flowing down by the outer side ends of the second plates 1412.

Figure 22:
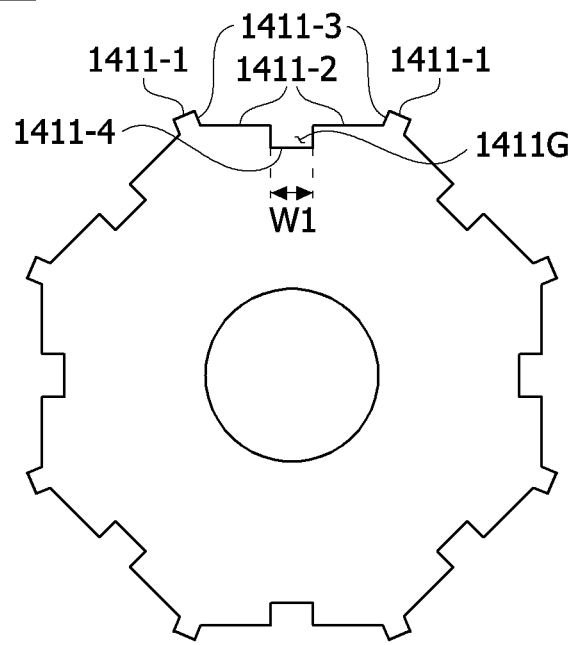
FIG. 22 is a set of plan views illustrating a first plate and a second plate.
Figure 22:
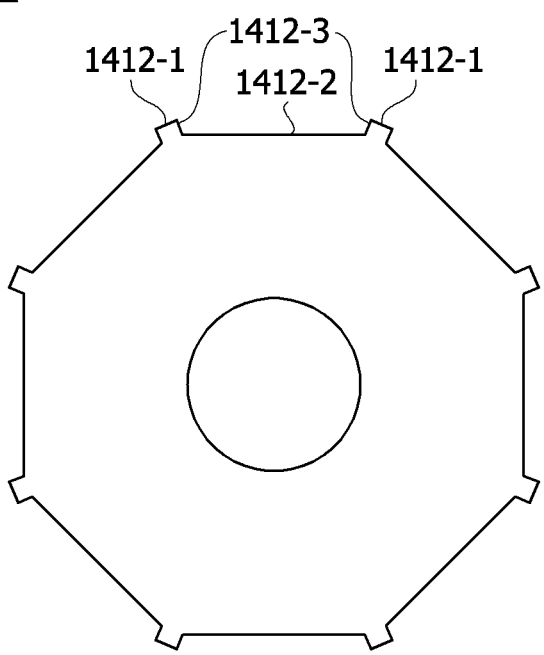

FIG. 22 is a set of plan views illustrating the first plate and the second plate.

Each of the first plates 1411 may include a plurality of 1-1 surfaces 1411-1, a plurality of 1-2 surfaces 1411-2, 1-3 surfaces 1411-3, and 1-4 surfaces 1411-4 on an outer circumferential surface thereof.

The plurality of 1-1 surfaces 1411-1 are provided. The plurality of 1-1 surfaces 1411-1 may be disposed between the plurality of magnets 1420. The plurality of 1-1 surfaces 1411-1 are spaced apart from each other in the circumferential direction. The 1-1 surfaces 1411-1 are not in contact with the magnets 1420.

The 1-2 surfaces 1411-2 may be disposed between the plurality of 1-1 surfaces 1411-1. The plurality of 1-2 surfaces 1411-2 may be provided. The plurality of 1-2 surfaces 1411-2 are spaced apart from each other. In this case, a distance from a center of a rotor to each of the 1-1 surfaces 1411-1 may be greater than a distance from the center of the rotor to each of the 1-2 surfaces 1411-2. That is, the 1-2 surfaces 1411-2 are formed to be recessed closer to a shaft 1500 than the 1-1 surfaces 1411-1. The 1-2 surfaces 1411-2 are in contact with inner side surfaces of the magnets 1420. In this case, first grooves 1411G may be formed in the 1-2 surfaces 1411-2.

The 1-3 surfaces 1411-3 connect the plurality of 1-1 surfaces 1411-1 and the plurality of 1-2 surfaces 1411-2. In this case, the 1-3 surfaces 1411-3 are in contact with two side surfaces of each of the magnets 1420.

The 1-4 surfaces 1411-4 are disposed between the plurality of 1-2 surfaces 1411-2. In this case, a distance from the center of the rotor to each of the 1-2 surfaces 1411-2 may be greater than the center of the rotor each of the 1-4 surfaces 1411-4. That is, the 1-4 surfaces 1411-4 are formed to be recessed closer to the shaft 1500 than the 1-2 surfaces 1411-2. In this case, the first grooves 1411G may be formed between the 1-4 surfaces 1411-4 and the magnets 1420. The first grooves 1411G of the first plates 1411 are connected in the axial direction. Accordingly, when the plurality of first plates 1411 are stacked, a groove extending in the axial direction may be formed. In addition, the adhesive G is disposed in the first grooves 1411G.

Each of the second plates 1412 may include a plurality of 2-1 surfaces 1412-1, 2-2 surfaces 1412-2, a plurality of 2-3 surfaces 1412-3 on an outer circumferential surface thereof.

The plurality of 2-1 surfaces 1412-1 are provided. The plurality of 2-1 surfaces 1412-1 may be disposed between the plurality of magnets 1420. The plurality of 2-1 surfaces 1412-1 are spaced apart from each other in the circumferential direction. The 2-1 surfaces 1412-1 are not in contact with the magnets 1420.

The 2-2 surfaces 1412-2 may be disposed between the plurality of 2-1 surfaces 1412-1. One 2-2 surface 1412-2 is disposed between the spaced 2-1 surfaces 1412-1. In this case, a distance from the center of the rotor to each of the 2-1 surfaces 1412-1 may be greater than a distance from the center of the rotor to each of the 2-2 surfaces 1412-2. That is, the 2-2 surfaces 1412-2 are formed to be recessed closer to the shaft 1500 than the 2-1 surfaces 1412-1. The 2-2 surfaces 1412-2 may be in contact with the inner side surfaces of the magnets 1420. In this case, grooves are not formed in the 2-2 surfaces 1412-2. In this case, parts of the 2-2 surfaces 1412-2 may overlap the first grooves 1411G in the axial direction.

The 2-3 surfaces 1412-3 connect the plurality of 2-1 surfaces 1412-1 and the plurality of 2-2 surfaces 1412-2. In this case, the 2-3 surfaces 1412-3 are in contact with two side surfaces of each of the magnets 1420.

Two second plates 1412 may be provided. As in FIGS. 19 and 20, one second plate 1412 may be stacked between the plurality of first plates 1411, and the other second plate 1412 may be disposed at a lower side of the plurality of first plates 1411. In this case, one second plate 1412 may support the adhesive flowing from the upper first grooves 1411H, the other second plate 1412 may support the adhesive flowing downward from the lower first grooves 1411G, and thus the downward flow of the adhesive can be more effectively inhibited.

A shape of the rotor core 1410 may be changed according to the number and a stack order of the first plates 1411 and the second plates 1412.

Figure 23:
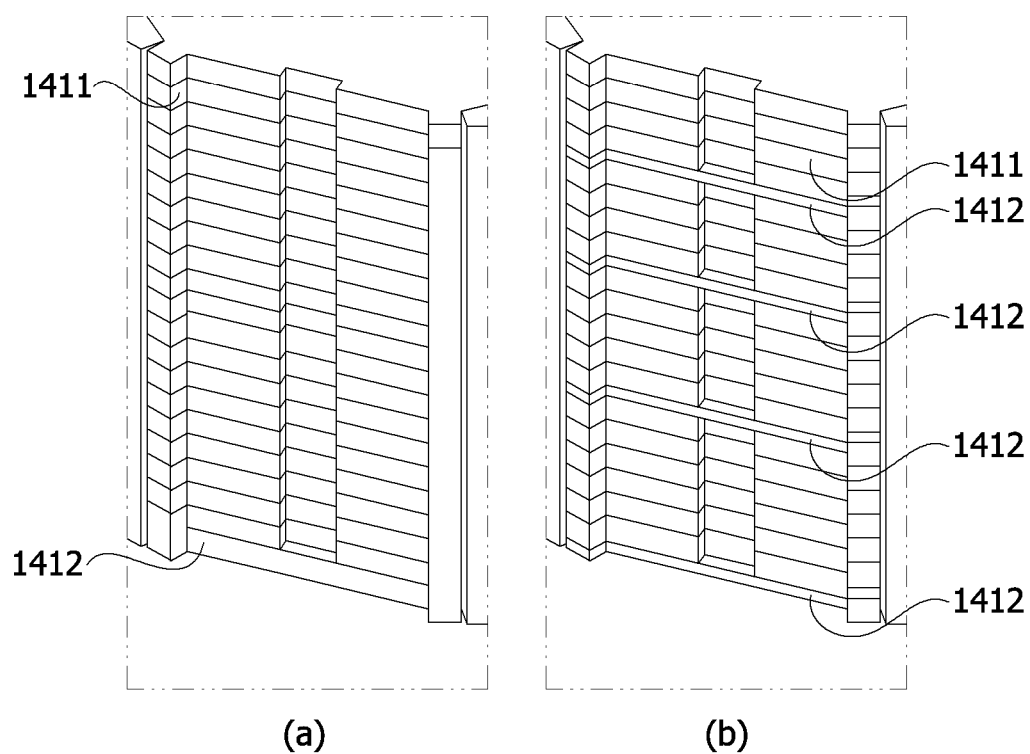
FIG. 23 is a set of views illustrating variously modified examples in which the numbers and stack orders of the first and second plates are changed.

FIG. 23 is a set of views illustrating variously modified examples in which the numbers and stack orders of the first and second plates are changed.

Referring to FIG. 23A, one second plate 1412 may be provided. In addition, a plurality of first plates 1411 may be sequentially stacked. In this case, one second plate 1412 may be disposed at a lower side of the plurality of first plates 1411. In this case, the second plate 1412 disposed at a lowermost end portion of a rotor core may block an adhesive flowing from first grooves of the first plates 1411.

Referring to FIG. 23B, three or more second plates 1412 may be provided. In this case, three or more second plates 1412 may be stacked between first plates 1411. In this case, the second plates 1412 disposed between the first plates 1411 are disposed apart from each other in an axial direction. In addition, one second plate 1412 may be stacked at a lower side of the plurality of first plates 1411.

As the number of the second plates 1412 increases, an effect of inhibiting adhesive from flowing down may be improved. However, as the number of the second plates 1412 increases, first grooves 1411G are shielded, a magnetic effect decreases, and thus magnetic characteristics of a rotor 1400 may be degraded. Accordingly, four or fewer second plates 1412 may be provided. In addition, the sum of thicknesses of one or more second plates 1412 in the axial direction may be less than 0.3 times a length of the rotor core in the axial direction. For example, the sum of the thicknesses of the one or more second plates 1412 in the axial direction may be less than 0.2 times the length of the rotor core in the axial direction.

The thickness of the second plate 1412 in the axial direction may be changed according to the number of the second plates 1412. Table 1 is a table showing a maximum thickness of each of the second plates according to the number of the second plates.

TABLE 1

| Height of rotor core in axial direction | Number of second plates | | |
| --- | --- | --- | --- |
|  | 1 | 2 | 4 |
| 20 mm | Less than 4 mm | Less than 2 mm | Less than 1 mm |
| 30 mm | Less than 6 mm | Less than 3 mm | Less than 1.3 mm |

As in Table 1, when the number of the second plates increases, the thickness of each of the second plates in the axial direction also decreases. In this case, when a ratio of the sum T of the thicknesses of the second plates in the axial direction to the length of the rotor core in the axial direction is greater than 0.2, magnetic characteristics of the rotor are degraded.

According to another embodiment of the present invention, in order to improve the magnetic characteristics of the rotor core, the rotor core may be formed so that grooves may be formed not to be completely blocked in the axial direction.

Figure 24:
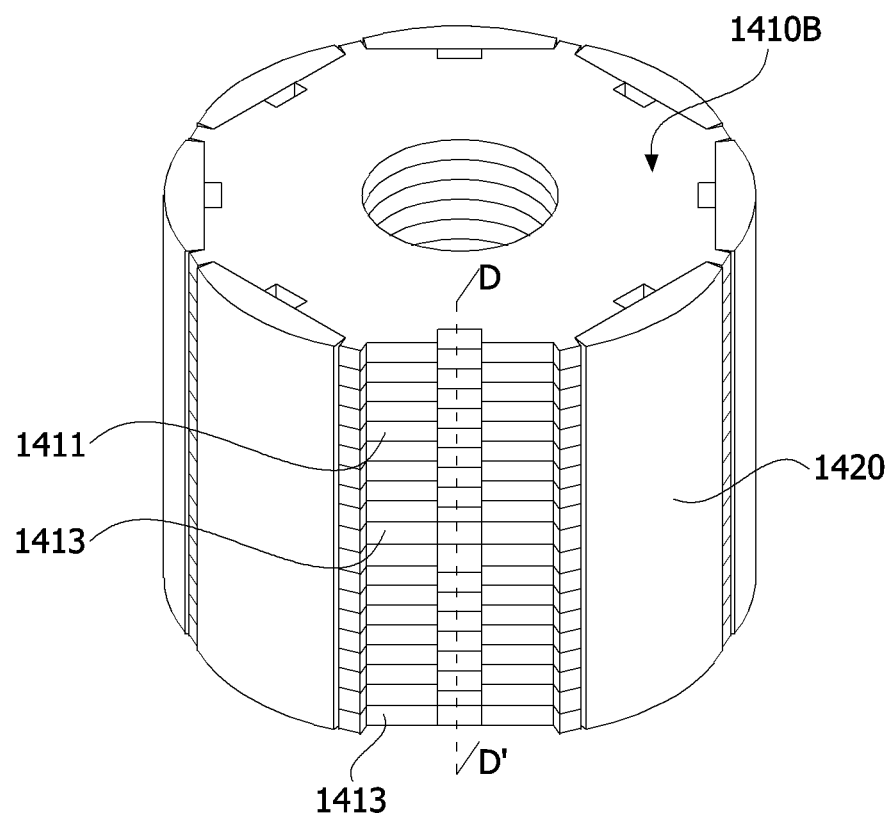
FIG. 24 is a view illustrating a rotor according to yet another embodiment.
Figure 25:
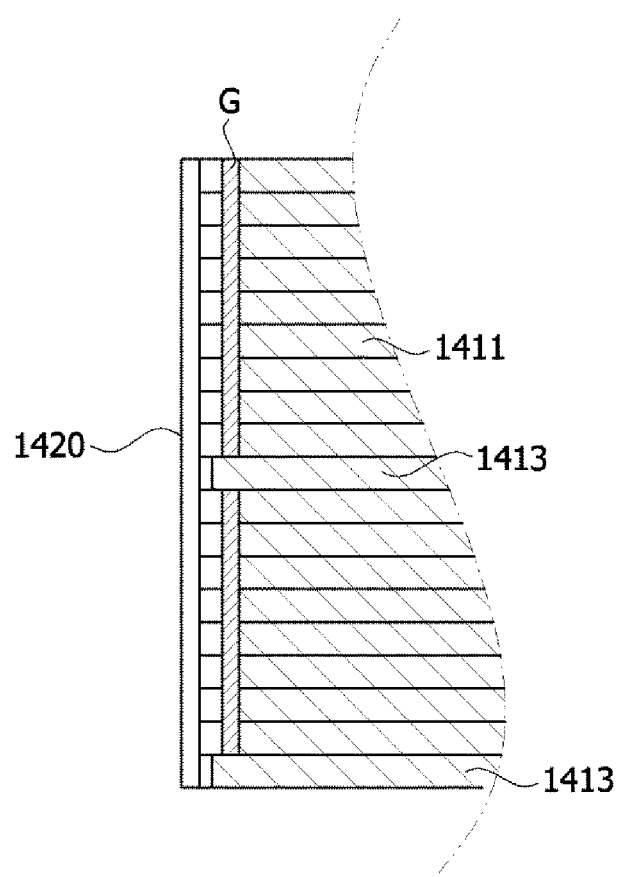
FIG. 25 is a view illustrating a state in which an adhesive is applied on a cross section DD' of FIG. 24.
Figure 26:
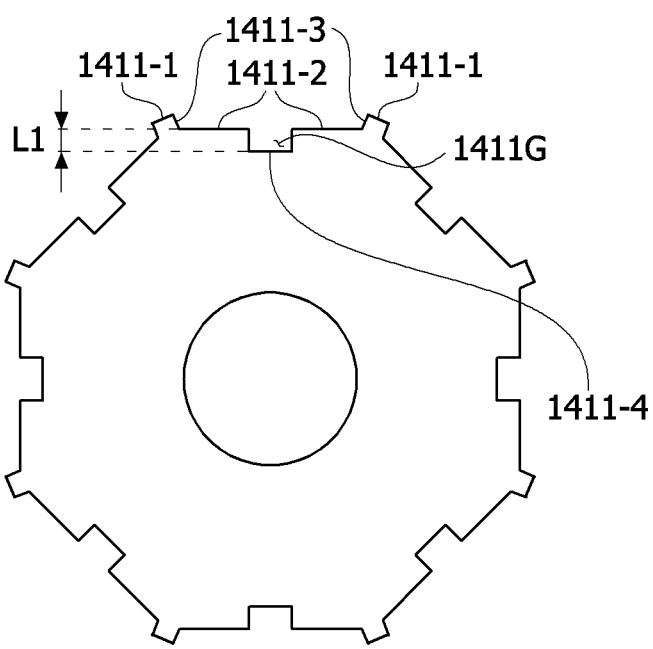
FIG. 26 is a set of plan views illustrating a first plate and a third plate.
Figure 26:
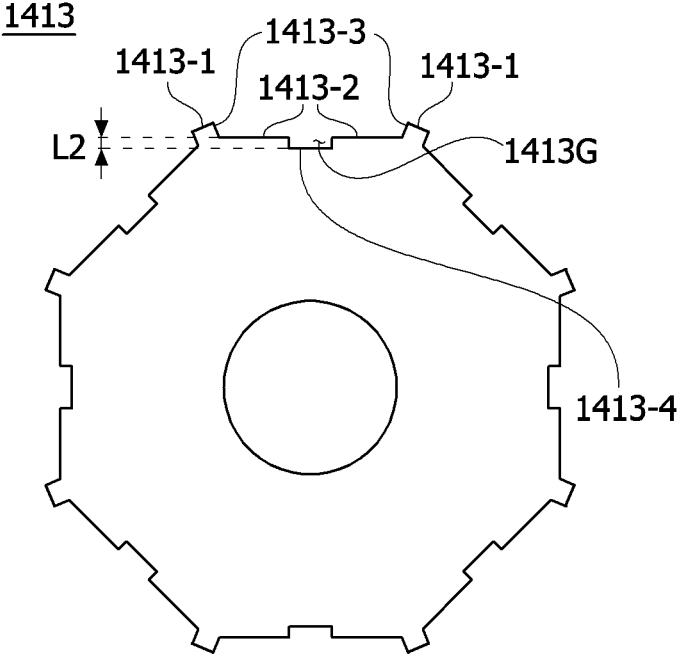

FIG. 24 is a view illustrating a rotor according to yet another embodiment, FIG. 25 is a view illustrating a state in which an adhesive is applied on a cross section DD' of FIG. 24, and FIG. 26 is a set of plan views illustrating a first plate and a third plate. In this case, since members of which reference numerals are identical to those of FIGS. 17 to 23 are the same members having the same shapes and functions, repeated description thereof will be omitted.

Referring to FIGS. 24 and 25, a rotor core 1410B may include a plurality of first plates 1411 and one or more third plates 1413. In this case, the plurality of first plates 1411 and one or more third plates 1413 may be stacked in an axial direction.

Referring to FIG. 26, first grooves 1411G may be formed in surfaces of the first plates 1411 in contact with magnets 1420, and second grooves 1413G may be formed in surfaces of the third plates 1413 in contact with the magnets 1420. Widths of the second grooves 1413G may be smaller than widths of the first grooves 1411G in a radial direction. In this case, the plurality of first plates 1411 and the third plates 1413 may be stacked in the axial direction so that the plurality of first grooves 1411G and one or more second grooves 1413G may be disposed collinear with each other in the axial direction. In this case, the plurality of first grooves 1411G may extend in the axial direction. In addition, the second grooves 1413G may be disposed between the extending plurality of first grooves 1411G. Alternatively, the second groove 1413G may be disposed at a lower side of the plurality of first grooves 1411B.

Each of the third plates 1413 may include a plurality of 3-1 surfaces 1413-1, a plurality of 3-2 surfaces 1413-2, a plurality of 3-3 surfaces 1413-3, and 3-4 surfaces 1413-4.

The plurality of 3-1 surfaces 1413-1 are provided. The plurality of 3-1 surfaces 1413-1 may be disposed between the plurality of magnets 1420. The plurality of 3-1 surfaces 1413-1 are spaced apart from each other in a circumferential direction. The 3-1 surfaces 1413-1 are not in contact with the magnets 1420.

The 3-2 surfaces 1413-2 may be disposed between the plurality of 3-1 surfaces 1413-1. The plurality of 3-2 surfaces 1413-2 are provided. The plurality of 3-2 surfaces 1413-2 are spaced apart from each other. In this case, a distance from a center of the rotor to each of the 3-1 surface 1413-1 may be greater than a distance from the center of the rotor to each of the 3-2 surfaces 1413-2. That is, the 3-2 surfaces 1413-2 are formed to be recessed closer to a shaft 1500 than the 3-1 surfaces 1413-1. The 3-2 surfaces 1413-2 are in contact with inner side surfaces of the magnets 1420. In this case, second grooves 1413G may be formed in the 3-2 surfaces 1413-2.

The 3-3 surfaces 1413-3 connect the plurality of 3-1 surfaces 1413-1 and the plurality of 3-2 surfaces 1413-2. In this case, the 3-3 surfaces 1413-3 are in contact with two side surfaces of each of the magnets 1420.

The 3-4 surfaces 1413-4 are disposed between the plurality of 3-2 surfaces 1413-2. In this case, a distance from the center of the rotor to each of the 3-2 surfaces 1413-2 may be greater than a distance from the center of the rotor to each of the 3-4 surfaces 1413-4. That is, the 3-4 surfaces 1413-4 are formed to be recessed closer to the shaft 1500 than the 3-2 surfaces 1413-2. In this case, the second grooves 1413G may be formed between the 3-4 surfaces 1413-4 and the magnets 1420. The first grooves 1411G of the first plates 1411 are connected in the axial direction. Accordingly, when the plurality of first plates 1411 are stacked, a groove extending in the axial direction may be formed. An adhesive G is not applied on the second grooves 1413G. However, a part of the adhesive G may also be disposed in the second grooves 1413G while the adhesive in the first grooves 1411G flows down.

According to yet another embodiment of the present invention, in a rotor core, all of the first plates, second plates, and third plates are applied. In this case, an entire lower end portion of a groove extending in an axial direction of the rotor core may be blocked, and only a part of an upper side portion thereof may be blocked.

Figure 27:
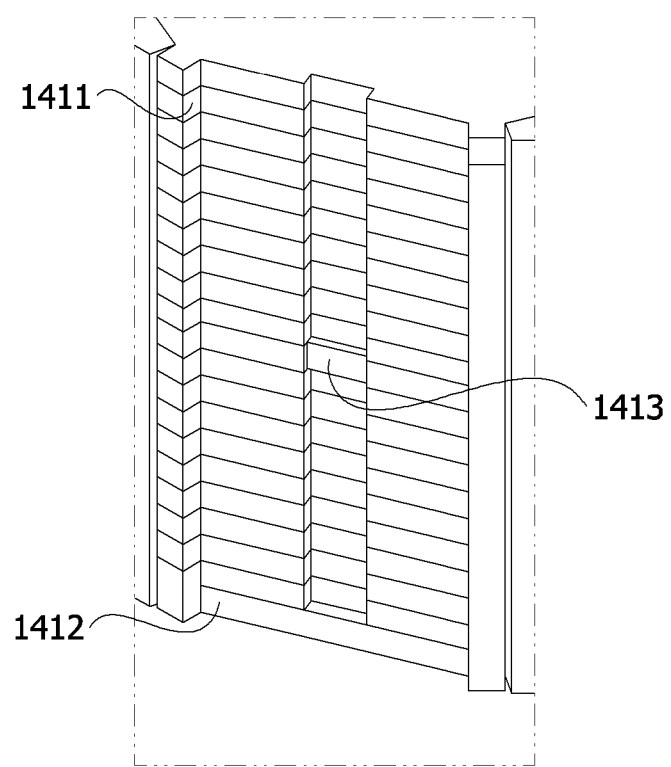
FIG. 27 is a view illustrating a rotor according to yet another embodiment.

FIG. 27 is a view illustrating a rotor according to yet another embodiment. In this case, since members of which reference numerals are identical to those of FIGS. 17 to 26 are the same members having the same shapes and functions, repeated description thereof will be omitted.

Referring to FIG. 27, a rotor core may be formed by stacking a plurality of first plates 1411, one or more second plates 1412, and one or more third plates 1413.

In this case, the third plates 1412 may be stacked between the plurality of first plates 1411. In addition, the second plates 1412 may be disposed under the stacked first plates 1411 and the third plates 1413. In this case, a part of an adhesive disposed in first grooves is blocked while the adhesive passes through second grooves, and the adhesive may be completely blocked by the second plates 1412.

An example of an inner rotor type motor has been described in the above-described embodiments but the present invention is not limited thereto. The present invention may also be applied to an outer rotor type motor. In addition, the present invention may be applied to various devices for vehicles or home appliances.

We claim:

1. A motor comprising:
a shaft;
a rotor coupled to the shaft; and
a stator disposed to correspond to the rotor,
wherein the rotor includes a rotor core, a magnet disposed on an outer surface of the rotor core, and a guide in contact with the rotor core,
the guide includes a first member in contact with one side surface of the rotor core and a plurality of second members which extend from the first member in an axial direction and are in contact with a side surface of the magnet, and
positions of one side end portions and the other side end portions of the second members are different from each other in a circumferential direction,
wherein the rotor core includes a plurality of protrusions protruding from an outer surface thereof, each of the protrusions is in contact with a side surface of one of the magnets, and one side end portion of each of the protrusions is in contact with one side end portion of each of the plurality of second members in the axial direction. respectively,
wherein an axial length of each of the protrusions is less than an axial length of the rotor core,
wherein each of the plurality of second members includes step surfaces (T1,T2) that are coplanar with a side surface of the first member, and
wherein the step surfaces (T1,T2) contact with an axial end of the magnet.

2. The motor of claim 1,
wherein the plurality of second members include a 2-1 member and a 2-2 member arranged in the axial direction,
wherein the 2-1 member and the 2-2 member are disposed to be misaligned in a circumferential direction, and
wherein the 2-1 member and the 2-2 member are integrally connected to each other.

3. The motor of claim 2, wherein:
the rotor core includes a first protrusion and a second protrusion, the first protrusion and the second protrusion protruding from the outer surface of the rotor core and disposed apart from each other in the axial direction, and wherein the first protrusion is in contact with the 2-1 member and the second protrusion is in contact with the 2-2 member in the axial direction.

4. The motor of claim 1,
wherein the rotor includes a first rotor core and a second rotor core which are disposed in the axial direction and a plurality of magnets disposed on an outer surface of the first rotor core and an outer surface of the second rotor core,
wherein the first rotor core includes a plurality of first protrusions protruding from the outer surface of the first rotor core,
wherein the second rotor core includes a plurality of second protrusions protruding from the outer surface of the second rotor core,
wherein the first member is disposed between the first rotor core and the second rotor core in the axial direction, and wherein the plurality of second members are disposed between the first protrusion and the second protrusion in the axial direction and are in contact with a side surface of each of the magnets,
wherein the first member is in contact with one side surface of the first rotor core and the other side surface of the second rotor core, and
wherein the second member is in contact with one side surface of the first protrusion and the other side surface of the second protrusion.

5. The motor of claim 1,
wherein each of the plurality of second members includes a body and an extension portion extending from the body, the body is in contact with the side surface of the magnet, and the extension portion is in contact with a part of an outer surface of the magnet.

6. The motor of claim 1,
wherein the first member includes a third protrusion protruding from one side and a fourth protrusion protruding from the other side in the axial direction, and the third protrusion is disposed to be misaligned with the fourth protrusion in a circumferential direction.

* * * * *